United States Patent
Shingler

(10) Patent No.: US 12,125,096 B2
(45) Date of Patent: Oct. 22, 2024

(54) AUGMENTED REALITY SOCIAL MEDIA PLATFORM, SYSTEMS, AND METHODS RELATED THERETO

(71) Applicant: Flying Eye Reality, Inc., St. John, IN (US)

(72) Inventor: Raymond Charles Shingler, Valparaiso, IN (US)

(73) Assignee: Flying Eye Reality, Inc., St. John, IN (US)

( * ) Notice: Subject to any disclaimer, the term of this patent is extended or adjusted under 35 U.S.C. 154(b) by 0 days.

(21) Appl. No.: 18/412,023

(22) Filed: Jan. 12, 2024

(65) Prior Publication Data

US 2024/0242267 A1   Jul. 18, 2024

Related U.S. Application Data

(60) Provisional application No. 63/508,936, filed on Jun. 19, 2023, provisional application No. 63/438,784, filed on Jan. 12, 2023.

(51) Int. Cl.
  *G06Q 30/0645* (2023.01)
  *G06F 3/01* (2006.01)
  (Continued)

(52) U.S. Cl.
  CPC ......... *G06Q 30/0645* (2013.01); *G06F 3/011* (2013.01); *G06Q 30/0269* (2013.01);
  (Continued)

(58) Field of Classification Search
  CPC . G06Q 30/0645; G06Q 30/0269; G06Q 50/01
  See application file for complete search history.

(56) References Cited

U.S. PATENT DOCUMENTS

| 9,351,118 B2 | 5/2016 | Crutchfield |
| 9,530,059 B2 | 12/2016 | Zises |

(Continued)

FOREIGN PATENT DOCUMENTS

| KR | 20120009639 A | 2/2012 |
| WO | PCT/US24/11441 | 4/2024 |

OTHER PUBLICATIONS

The Surprising Applications of AR and VR in Real Estate; Ben Luxon (Year: 2019).*

(Continued)

*Primary Examiner* — Dennis W Ruhl
(74) *Attorney, Agent, or Firm* — Birch Tree IP Law & Strategy PLLC; Jamie T. Gallagher

(57) ABSTRACT

Augmented reality social media platforms and methods of managing the same in which a real-world defined area is virtually mapped to include a plurality of leasable virtual subdivisions each corresponding to a real-world subdivision of the real-world defined area. A platform may assign a virtual leasehold corresponding to a virtual subdivision of a plurality of leasable virtual subdivisions to a user of the platform. In one aspect the ability to assign a virtual leasehold to a user is based on the user's affiliation or non-affiliation with a real-world organization controlling the corresponding real-world defined area. In another aspect a virtual leasehold may be reassigned to a different virtual subdivision and/or a real-world offering associated with a virtual leasehold may be reallocated to a different virtual leasehold.

62 Claims, 4 Drawing Sheets

(51) Int. Cl.
  *G06Q 30/0241*   (2023.01)
  *G06Q 30/0251*   (2023.01)
  *G06Q 50/00*   (2024.01)
  *G06T 19/00*   (2011.01)
  *G06F 3/0482*   (2013.01)

(52) U.S. Cl.
  CPC ......... *G06Q 30/0277* (2013.01); *G06Q 50/01* (2013.01); *G06T 19/006* (2013.01); *G06F 3/0482* (2013.01); *G06T 2219/024* (2013.01)

(56) References Cited

U.S. PATENT DOCUMENTS

| | | | |
|---|---|---|---|
| 9,645,221 | B1 | 5/2017 | Heizer |
| 9,743,244 | B2 | 8/2017 | Crutchfield |
| 10,108,859 | B1 | 10/2018 | Suiter et al. |
| 10,223,738 | B1 | 3/2019 | Suiter et al. |
| 10,250,948 | B1* | 4/2019 | Bortz ............... H04N 21/4788 |
| 10,257,649 | B2 | 4/2019 | Crutchfield et al. |
| 10,334,134 | B1 | 6/2019 | Suiter et al. |
| 10,402,650 | B1 | 9/2019 | Suiter et al. |
| 10,638,256 | B1 | 4/2020 | Suiter |
| 10,743,131 | B2 | 8/2020 | Shingler |
| 10,805,696 | B1 | 10/2020 | Suiter et al. |
| 10,839,219 | B1 | 11/2020 | Suiter et al. |
| 10,848,909 | B1 | 11/2020 | Shingler |
| 10,945,094 | B2 | 3/2021 | Shingler |
| 10,992,836 | B2 | 4/2021 | Suiter et al. |
| 11,026,046 | B2 | 6/2021 | Crutchfield et al. |
| 11,044,393 | B1 | 6/2021 | Suiter et al. |
| 11,201,981 | B1* | 12/2021 | Suiter ............... G06Q 30/0639 |
| 11,528,580 | B2 | 12/2022 | Shingler |
| 11,533,585 | B2 | 12/2022 | Shingler |
| 11,653,176 | B2 | 5/2023 | Shingler |
| 2007/0125861 | A1 | 6/2007 | Shoobridge |
| 2008/0051033 | A1 | 2/2008 | Hymes |
| 2008/0268876 | A1 | 10/2008 | Gelfand et al. |
| 2013/0043302 | A1 | 2/2013 | Powlen et al. |
| 2013/0066964 | A1 | 3/2013 | Odio et al. |
| 2014/0236468 | A1 | 8/2014 | Dave et al. |
| 2015/0178993 | A1 | 6/2015 | Skarulis |
| 2015/0206349 | A1 | 7/2015 | Rosenthal et al. |
| 2015/0296340 | A1 | 10/2015 | Crutchfield |
| 2016/0132912 | A1 | 5/2016 | Beggy et al. |
| 2016/0171305 | A1 | 6/2016 | Zises |
| 2016/0203352 | A1 | 7/2016 | Marsico |
| 2016/0234643 | A1 | 8/2016 | Crutchfield |
| 2016/0335289 | A1 | 11/2016 | Andrews |
| 2017/0359690 | A1 | 12/2017 | Crutchfield et al. |
| 2018/0069817 | A1 | 3/2018 | Constantinides |
| 2018/0070206 | A1 | 3/2018 | Shingler |
| 2019/0108580 | A1* | 4/2019 | Spivack ............... G06Q 30/06 |
| 2019/0246238 | A1 | 8/2019 | Crutchfield et al. |
| 2019/0312990 | A1 | 10/2019 | Suiter et al. |
| 2020/0104522 | A1* | 4/2020 | Collart ............... G06T 19/20 |
| 2020/0193717 | A1 | 6/2020 | Daly |
| 2020/0374652 | A1 | 11/2020 | Shingler |
| 2020/0374654 | A1 | 11/2020 | Shingler |
| 2021/0081033 | A1 | 3/2021 | Gaconnier |
| 2021/0160657 | A1 | 5/2021 | Shingler |
| 2021/0185479 | A1 | 6/2021 | Shingler |
| 2021/0195371 | A1 | 6/2021 | Shingler |
| 2021/0405959 | A1 | 12/2021 | Lovitt |
| 2022/0207846 | A1* | 6/2022 | Angevine ............... G06T 17/05 |
| 2022/0279309 | A1 | 9/2022 | Shingler |
| 2022/0292543 | A1* | 9/2022 | Henderson ......... G06Q 30/0252 |
| 2023/0030094 | A1 | 2/2023 | Shingler |
| 2023/0031740 | A1 | 2/2023 | Shingler |
| 2023/0033210 | A1 | 2/2023 | Shingler |
| 2023/0353976 | A1 | 11/2023 | Shingler |
| 2023/0362584 | A1 | 11/2023 | Shingler |
| 2023/0362585 | A1 | 11/2023 | Shingler |
| 2023/0362586 | A1 | 11/2023 | Shingler |
| 2023/0370811 | A1 | 11/2023 | Shingler |
| 2024/0022871 | A1 | 1/2024 | Shingler |
| 2024/0086382 | A1 | 3/2024 | Soon-Shiong et al. |

OTHER PUBLICATIONS

"Engage Trade Show Attendees with Virtual & Augmented Reality", Apogee exhibits (Year: 2019).*
Hile, H et al., "Landmark-Based Pedestrian Navigation from Collections of Geotagged Photos", Research Gate-Conference Paper (2008), publication at: https://www.researchgate.net/publication/221342528 (10 pages).
U.S. Appl. No. 15/696,803, filed Sep. 6, 2017, U.S. Pat. No. 10,743,131.
U.S. Appl. No. 16/989,348, filed Aug. 10, 2020, U.S. Pat. No. 10,848,909.
U.S. Appl. No. 16/989,713, filed Aug. 10, 2020, U.S. Pat. No. 10,945,094.
U.S. Appl. No. 17/166,679, filed Feb. 3, 2021.
U.S. Appl. No. 17/186,265, filed Feb. 26, 2021, U.S. Pat. No. 11,533,585.
U.S. Appl. No. 17/197,808, filed Mar. 10, 2021, U.S. Pat. No. 11,528,580.
U.S. Appl. No. 17/206,218, filed Mar. 19, 2021, U.S. Pat. No. 11,653,176.
U.S. Appl. No. 17/966,793, filed Oct. 15, 2022.
U.S. Appl. No. 17/966,845, filed Oct. 16, 2022.
U.S. Appl. No. 17/966,846, filed Oct. 16, 2022.
U.S. Appl. No. 18/356,686, filed Jul. 21, 2023.
U.S. Appl. No. 18/356,717, filed Jul. 21, 2023.
U.S. Appl. No. 18/356,740, filed Jul. 21, 2023.
U.S. Appl. No. 18/356,748, filed Jul. 21, 2023.
U.S. Appl. No. 18/356,763, filed Jul. 21, 2023.
U.S. Appl. No. 18/356,775, filed Jul. 21, 2023.
U.S. Appl. No. 18/344,678, filed Jun. 29, 2023.
U.S. Appl. No. 18/412,023, filed Jan. 12, 2024.
U.S. Appl. No. 18/706,331, filed Apr. 30, 2024.
U.S. Appl. No. 18/651,378, filed Apr. 30, 2024.
U.S. Appl. No. 18/651,395, filed Apr. 30, 2024.
U.S. Appl. No. 18/651,395, Dated Jul. 9, 2024, Notice of Allowance.
U.S. Appl. No. 18/651,378, Dated Jul. 16, 2024, Office Action.

* cited by examiner

AUGMENTED REALITY SOCIAL MEDIA PLATFORM, SYSTEMS, AND METHODS RELATED THERETO

RELATED APPLICATION DATA

This application claims the benefit of priority of U.S. Provisional Patent Application Ser. No. 63/438,784, filed Jan. 12, 2023, entitled "Augmented Reality Social Media Platform, Systems, and Methods Related Thereto" and the benefit of priority of U.S. Provisional Patent Application Ser. No. 63/508,936, filed Jun. 19, 2023, entitled "Augmented Reality Social Media Platform, Systems, and Methods Related Thereto," each of which application is incorporated by reference herein in its entirety.

SUMMARY OF THE DISCLOSURE

In one implementation, a method for managing an augmented reality social media platform is provided. The method includes providing an augmented reality social media platform application to a plurality of devices, the augmented reality social media application for providing one or more augmented reality user interfaces of the augmented reality social media platform; receiving from an optical capture element of a first device belonging to a first user, a still and/or moving image of a first real-world proximity surrounding the first device, the first real-world proximity being a part of a real-world defined area that is controlled by a first real-world organization, the augmented reality social media platform including a virtual mapping corresponding to the real-world defined area, the virtual mapping including a plurality of leasable virtual subdivisions, each of the leasable virtual subdivisions corresponding to a real-world subdivision of the real-world defined area; receiving from a second user of the augmented reality social media platform a request to lease a first virtual subdivision of the plurality of leasable virtual subdivisions; receiving a first identifier of the real-world identity of the second user; correlating the first identifier with a current database of people currently affiliated with the first real-world organization; if the first identifier positively correlates with a person in the current database: assigning within the augmented reality social media platform a first virtual leasehold corresponding to the first virtual subdivision to the second user, the first virtual leasehold including a time limitation corresponding to the second user's affiliation with the first real-world organization; displaying via a first display of the one or more augmented reality user interfaces an augmented display of the first real-world proximity; and when the first real-world proximity corresponds to the first real-world subdivision, displaying via the first display one or more virtual indicators associated with the first virtual leasehold; and if the first identifier does not correlate with a person in the current database: providing a second display of the one or more augmented reality user interfaces to the second user with a denial of the first virtual leasehold.

In another implementation, a method for managing an augmented reality social media platform is provided. The method includes providing an augmented reality social media platform application to a plurality of devices, the augmented reality social media application for providing one or more augmented reality user interfaces of the augmented reality social media platform; receiving from an optical capture element of a first device belonging to a first user, a still and/or moving image of a first real-world proximity surrounding the first device, the first real-world proximity being a part of a real-world defined area that is controlled by a first real-world organization, the augmented reality social media platform including a virtual mapping corresponding to the real-world defined area, the virtual mapping including a plurality of leasable virtual subdivisions, each of the leasable virtual subdivisions corresponding to a real-world subdivision of the real-world defined area; receiving from a second user of the augmented reality social media platform a request to lease a first virtual subdivision of the plurality of leasable virtual subdivisions; receiving a first identifier of the real-world identity of the second user; correlating the first identifier with a current database of people currently affiliated with the first real-world organization; if the first identifier positively correlates with a person in the current database: assigning within the augmented reality social media platform a first virtual leasehold corresponding to the first virtual subdivision to the second user, the first virtual leasehold including a time limitation corresponding to the second user's affiliation with the first real-world organization; displaying via a first display of the one or more augmented reality user interfaces an augmented display of the first real-world proximity; and when the first real-world proximity corresponds to the first real-world subdivision, displaying via the first display one or more virtual indicators associated with the first virtual leasehold; if the first identifier does not correlate with a person in the current database: providing a second display of the one or more augmented reality user interfaces to the second user with a denial of the first virtual leasehold; temporarily reassigning within the augmented reality social media platform the first leasehold to a second virtual subdivision of the plurality of leasable virtual subdivisions; providing a second augmented reality user interface of the augmented reality social media platform to a third user of the augmented reality social media platform, the second augmented reality user interface including: a display of a second proximity of the third user, the second proximity including a second real-world subdivision corresponding to the second virtual subdivision, and a display of a second virtual indicator associated with a real-world offering of the first leasehold; temporarily allocating one or more shared real-world offerings from a first inventory listing of the first virtual leasehold to a second virtual leasehold corresponding to a third virtual subdivision of the plurality of leasable virtual subdivisions; and providing a third augmented reality user interface of the augmented reality social media platform to a fourth user of the augmented reality social media platform, the third augmented reality user interface including: a display of a second proximity of the fourth user, the second proximity including a second real-world subdivision corresponding to the third virtual subdivision, and a display of a third virtual indicator associated with a first one of the one or more shared real-world offerings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Systems and methods are provided that relate to exemplary embodiments of an augmented reality social media platform ("ARSM platform").

In one aspect, one or more embodiments of an augmented reality social media platform and associated methods according to the current disclosure may be implemented across a plurality of computing devices, for example over one or more networks. In one such example, components of a platform are located on one or more centralized computer devices (e.g., a cloud resource) and users of the platform access the one or more centralized computer devices via one or more networks. Such access may be by any well-known mechanisms. Examples of such mechanisms include, but are not limited to, Internet connectivity using a web-based application user interface (e.g., using an Internet browsing application on a user device), application software running on a user device that connects to the platform over a network, other known distributed and centralized systems, and any combinations thereof. In one example, machine-executable instructions exist on one or more centralized computer devices and each user of the platform utilizes a local application program or a web-based interface to connect to the one or more centralized computer devices. In one such example, a user can download a user application program that is a part of the platform from a mobile operating system application store (e.g., an Apple iOS store, an Android application store, etc.), from one of the one or more centralized computer devices of the platform, or from another downloadable resource center. One example of a user application program may include machine executable instructions stored in the user computing device that interacts with operating system components and hardware components of the user computing device to communicate over a network to the centralized portions of an ARSM platform of the current disclosure and to execute such instructions to provide one or more user interfaces of the ARSM platform to the user and execute portions of one or more of the aspects of an ARSM platform and related methods as disclosed herein.

Figure 1:
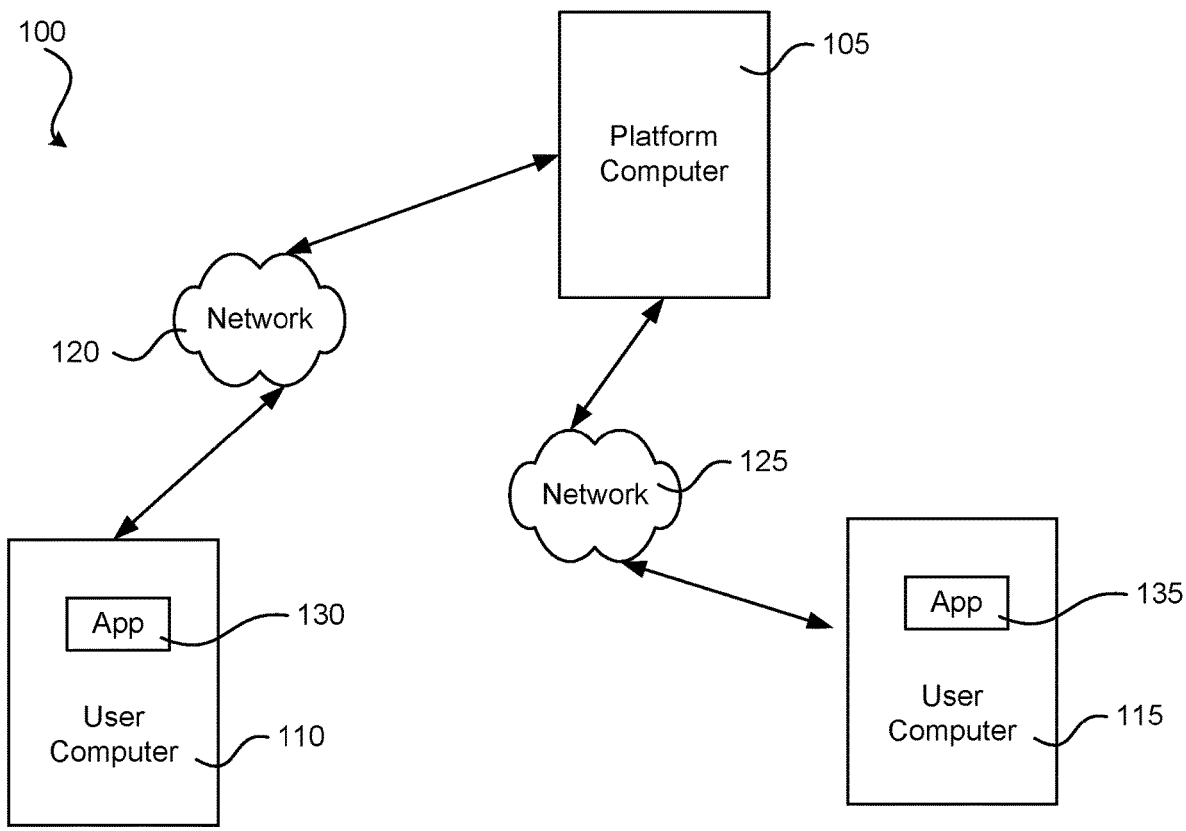
FIG. 1 illustrates one example of a diagrammatic illustration of an exemplary network disbursed implementation that can be utilized for an augmented reality social media platform and associated methods.

FIG. 1 illustrates one example of a diagrammatic illustration of an exemplary network disbursed implementation 100 that can be utilized for an augmented reality social media platform and associated methods. Implementation 100 has its components disbursed across physical components (e.g., memory elements, processors, etc.) of one or more platform computing devices 105 and user computer devices 110 and 115. Computer devices 105, 110, and 115 are connected via networks 120, 125. In one example of a disbursed implementation, such as implementation 100, a portion of the augmented reality social media platform ("ARSM platform") is stored in a memory of computing device 105 for execution by a processor of device 105 and communication with one or more of user computers (such as computers 110, 115) on which a portion (e.g., a client portion) of the ARSM platform is stored (e.g., via a memory) and executed (e.g., via a processor). In one such example, programmatic elements (as described herein) of an ARSM platform are downloaded to a client portion on computer 110, 115 from computer 105 (or other source) with executable programming running on a processor of computer 110, 115 and a displayable and interactive portion being run at the client portion on computer 110, 115. ARSM platform 100 is shown with optional user application portion 130 (on user computing device 110) and user application portion 135 (on user computing device 115). In another example, a majority of an ARSM platform is stored and processed on computer 105 with displayable interactions being communicated to one or more of client computers 110, 115. Examples of computing devices, networks, and other related components are discussed below.

In one exemplary aspect, a ARSM platform of the current disclosure includes one or more user interfaces that display images and/or graphic elements to a user (e.g., via a display device associated with a user computing device) and allow a user to interact with the ARSM platform. Multiple users can access and interact with exemplary implementations of an ARSM platform and, optionally, interact with each other (e.g., taking part in electronic messaging, interactive play, sharing of user generated content, sharing of third-party content, taking part in events presented via the ARSM platform, interacting as will be understood by those of ordinary skill by the current disclosure, otherwise interacting as is well known and common in social media platforms, and combinations of such interactions). Example implementations of an ARSM platform and related methods of the current disclosure include at least one user interface that blends aspects of the real-world with digital aspects. It is noted that not all user interfaces of an ARSM platform will include both real-world and digital world aspects (sometimes referred to as virtual aspects). General concepts of augmented reality are known and will be understood to a person of ordinary skill in light of the current disclosure, some of which will be understood to be combinable with the embodiments, implementations, and aspects described herein.

An ARSM platform and related methods of the current disclosure include a virtual mapping of a real-world defined area. A real-world defined area is an area of the real-world that is defined in the ARSM platform as a discrete subset of all the available areas of the real-world. Examples of a real-world defined area include, but are not limited to segments of land real estate, floors of a building, other areas of an elevated structure, other natural or manmade area, and any combinations thereof. A border of a real-world defined area may be any existing, created, or arbitrary border in any dimension. Examples of borders that can be used by an ARSM platform to define the boundaries of a real-world defined area include, but are not limited to, a real estate border, a government enforced border of a recognized entity, other legally created borders, a geographic natural border, an arbitrary border (e.g., a border input by a user of an ARSM platform via a user interface), a border selected by an operator of an ARSM platform, a border randomly selected by the ARSM platform, boundaries of a floor of a building, boundaries of a level of a stadium or other man-made structure, other man made borders, and any combinations thereof.

In one example, a real-world defined area includes the land, various levels of buildings, and the like of the properties of an educational institution, such as a university campus and related structures. In some examples, a real-world defined area will include multiple vertically positioned areas (e.g., multiple floors of a building within the same real-world defined area). It is also possible to have different real-world defined areas that are positioned on top of each other (e.g., multiple floors of a building in which one or more floors belong to a first real-world defined area and one or more other floors belong to a different real-world defined area, such as may be the case in a large office building with multiple tenants).

A virtual mapping of a real-world defined area is a mapping within an ARSM platform that the ARSM platform uses to represent and/or correlate to a real-world defined area. A virtual mapping can be used to organize features, activities, objects, interactions, augmented reality user interfaces, etc. of an ARSM platform in relation to the corresponding real-world defined area. In one exemplary aspect, a virtual mapping may include digital information that defines the boundaries of the virtual mapping corresponding to the mapped real-world defined area. A virtual mapping may have any height with respect to the real-world defined area to which it corresponds (e.g., zero height, any measurable height that is useful for the ARSM platform to operate and/or provide one or more augmented reality user interfaces combining a virtual element and a real-world element, etc.). A virtual mapping may or may not have displayable elements that appear in one or more user interfaces of an ARSM platform. In one exemplary aspect, one or more intuitively configured user interfaces of a virtual mapping can be utilized by an ARSM platform to display to a user multiple layers (e.g., a single real-world defined area with multiple vertically positioned areas, multiple real-world defined areas positioned on top of each other) with one or more multi-layer visual display features to assist the user in navigating the multiple layers. Examples of multi-layer visual display features include, but are not limited to, a different color for each layer, a different visual texture for each layer, and any combinations thereof. Multiple layers may be viewed simultaneously by a user in a user interface and/or individually depending on the design needs of a given ARSM platform. In one example, an ARSM platform is configured to display to a user multiple available vertically positioned layers and allow the user to select one or more layers to further display (e.g., removing one or more unselected layers from view in the user interface). In another example, an ARSM platform is configured to display to a user a single layer from multiple layers (e.g., after selection in a user interface, based on preferences of a user, based on a permission of a user to access a layer, etc.).

An ARSM platform may include (and/or be connected to externally) functionality to generate guidance for a user in navigating/interacting with a virtual mapping and/or other visual representations of a real-world defined area within an augmented reality environment. Examples of such guidance include, but are not limited to, guidance and/or recommendations related to navigating and/or selecting one or more of multiple layers in a vertically stacked arrangement as discussed above, guidance and/or recommendations related to navigating a single layer real-world defined area or subpart thereof, guidance and/or recommendations related to interacting with one or more virtual objects, limiting access to a layer in a multiple layer environment, limiting access to a subarea of a real-world defined area (e.g., a virtual subdivision), limiting access to a virtual object (e.g., a product for sale, a virtual indicator of a virtual leasehold), categorization of one or more virtual objects, categorization of one or more real-world objects, categorization of one or more real-world offerings, recognition of a real-world object present in a real-world defined area (e.g., for creation of a corresponding virtual object), and any combinations thereof. Such generation of user guidance may be based on any of a variety of information that may be available to the particular ARSM platform. Examples of information for basing a generation of a user guidance include, but are not limited to, a user preference (e.g., a preference from a user setting or other user interface), a user setting, a setting by an owner of a virtual leasehold, a behavior of a user in the platform (e.g., data recorded of a user's movements, selections, choices, other interactions, etc.), an interest of a user (e.g., input by a user into an ARSM platform, detected by a platform by a behavior of a user, imported from a source external to the corresponding platform, and any combinations thereof. In one exemplary aspect, such information may be used by an ARSM platform and/or a user of a platform (e.g., via a user interface provided to the user by the platform) to customize a virtual mapping and/or an environment included in a virtual mapping (e.g., to have one or more user interfaces showing a virtual mapping or virtual objects thereof as shown to a particular user include information, objects, and features that are more relevant to that user). An ARSM platform (or other digital platform including one or more of the concepts disclosed herein) may utilize one or more specialized technologies in generating a guidance and/or customization. Examples of such specialized technologies include, but are not limited to, a machine learning algorithm or other technology, an artificial intelligence technology, a data analytics technology, a computer vision technology, and any combinations thereof.

In one example, a machine learning algorithm can be trained to recognize and categorize real-world objects in a real-world defined area (e.g., using one or more cameras of users while utilizing a platform, using one or more cameras or other computer vision technologies operated by an agent of a platform). In one such example, information obtained by such recognition and categorization can be utilized by a platform in the generation of a virtual map (e.g., making a virtual mapping more detailed and/or accurate). In another example, a computer vision technology can be used by an ARSM platform to track one or more real-world objects in a real-world defined area (e.g., as such object moves within the real-world defined area) and incorporate a virtual object representing the real-world object into one or more user interfaces presented to a user of the platform via a virtual mapping or otherwise (e.g., presented in real time to the user). Combinations of such examples above are contemplated.

It is contemplated that for any particular real-world defined area (or sub area thereof), a plurality of different virtual mappings could be generated with each of the plurality of virtual mappings being customized for a particular purpose. Examples of such purposes include, but are not limited to, customization for a given user, customization for a specific application, customization for a particular industry, customization for a particular customer of a platform, customization for a particular service, customization for a particular organization (such as a university or college), and any combinations thereof. Two or more of a plurality of such virtual mappings of the same area/space may be displayed to a user to allow a user to select and/or navigate a chosen virtual mapping (e.g., similarly as discussed above with other multi-layer displays of virtual mapping and related concepts, guidance, and customizations).

A virtual mapping according to the current disclosure may be virtually divided to include one or more subdivisions with each virtual subdivision corresponding to a real-world subdivision of the real-world defined area. In one example, a virtual mapping according to the current disclosure is virtually divided to include one or more virtual subdivisions with each virtual subdivision corresponding to a real-world subdivision of the real-world defined area. An ARSM platform may store information (e.g., within a memory of the ARSM platform) necessary to represent the virtual mapping and any related virtual subdivisions. Example information to represent a virtual mapping includes, but is not limited to, information defining a border, dimension, and/or shape of a real-world defined area; information defining a border, dimension, and/or shape of a virtual subdivision of a real-world defined area; information defining a border, dimension, and/or shape of a real-world subdivision of a real-world defined area; and any combinations thereof. In one example, an ARSM platform stores information defining a real-world defined area and included virtual subdivisions. In such an example, it may not be necessary to store information of corresponding real-world subdivisions as such are represented within the ARSM platform by the corresponding virtual subdivisions. In another example, an ARSM platform stores information defining a plurality of virtual subdivisions of a real-world defined area. In such an example, it may not be necessary to store information of the borders of the real-world defined area itself if such borders are determinable from the information about the included virtual subdivisions. In yet another example, an ARSM platform stores information defining a real-world defined area, one or more virtual subdivisions, and one or more corresponding real-world subdivisions.

The borders of a real-world subdivision (and the corresponding virtual subdivision) within a real-world defined area may be any set of borders. Examples of a border that may be used to define a real-world subdivision of a real-world defined area for an ARSM platform include, but are not limited to, a real estate border, a government enforced border of a recognized entity, other legally created borders, a geographic natural border, an arbitrary border (e.g., a border input by a user of an ARSM platform via a user interface), a border selected by an operator of an ARSM platform, a border randomly selected by the ARSM platform, boundaries of a floor of a building, boundaries of a level of a stadium or other man-made structure, other man made borders, and any combinations thereof. A real-world subdivision may have any dimensions or shape that works for an ARSM platform to create corresponding virtual subdivisions. Example shapes for a real-world subdivision include, but are not limited to, a polygon, a circle, a rectangle, and a square. Combinations of differently shaped and dimensioned real-world subdivisions (and corresponding virtual subdivisions) within the same real-world defined area are possible. In one example of a virtual mapping of a real-world defined area within an ARSM platform differently shaped real-world subdivisions are used. In another example of virtual mapping of a real-world defined area within an ARSM platform the real-world subdivisions have the same shape. It is possible for a virtual mapping of a real-world defined area to have one or more areas that are not represented by virtual subdivision. In one example, a virtual mapping of a real-world defined area includes one or more areas that are not represented by a virtual subdivision. In one such example, non-divided areas are formed by non-adjacent portions of adjacent subdivision shapes (e.g., when multiple circle-shaped virtual subdivisions are adjacent to each other, there is space not included within the circle-shaped subdivisions). In another such example, non-divided areas are formed by placement of virtual subdivisions in a manner that is not adjacent to other virtual subdivisions leaving area of the virtual mapping of the real-world defined area open.

An ARSM platform may be configured to utilize user input mapping information in the virtual mapping process (e.g., via one or more of the users of the platform providing information in a user interface of a platform, a platform collecting information from users in the operation of the platform, or otherwise input or available to a platform). Such user input mapping information may be utilized in creating virtual objects within a real-world defined area (including within a virtual subdivision) and/or in determining a characteristic of a real-world defined area (or corresponding real-world/virtual subdivisions), such as a location, size, shape, and/or border of an area. Examples of user input mapping information include, but are not limited to, a real-world point of interest, a building, a business entity, an organization, a park, a public meeting place, and any combinations thereof. In one exemplary aspect, user input mapping information can assist with a platform crowd sourcing information to provide an increased usefulness and/or comprehensiveness to a virtual mapping.

An ARSM platform may utilize a variety of additional information in the process of creating, defining, managing, and changing over time one or more mapping properties of a real-world defined area, a real-world subdivision, and/or a virtual subdivision (e.g., a location, a border, a size, a shape, properties of a virtual object therein, and/or other property). Examples of such information include, but are not limited to, information obtained from a GPS functionality/technology related to a location of a real-world object and/or a user, information from one or more sensors located near or in an area, social media data, data from a mobile telephone network, information from satellite imagery, information from one or more cameras located in an area (e.g., a traffic camera, a public safety camera, a surveillance camera, etc.), a weather data, and any combinations thereof. Such information may change over time and an ARSM platform may be configured to change one or more properties of a real-world defined area, a real-world subdivision, and/or a virtual subdivision over time based (fully or partially in combination with other information) on the changed information.

GPS functionality and technologies are known and may be included in a computing device associated with a platform (e.g., a device of a user, a device operated by an agent of a platform) and/or connected to a real-world object that is of interest to an ARSM platform (e.g., attached to a real-world object for which a virtual object is included in a virtual mapping or otherwise associated with a platform). Such information may be accessed by a platform from such a device (e.g., in real time and/or accumulated over time). In one example, data from a GPS functionality/technology can be used by an ARSM platform to track a movement of an object or person with such information being used the platform to create, define, and/or change a mapping property (such as a border of a real-world subdivision/corresponding virtual subdivision). One or more sensors (e.g., motion sensors, optical sensors, environmental sensors, etc.) may be located within or near an area that is part of a real-world defined area. Such sensors may be part of a sensor network. In one example, data from one or more sensors can be used by an ARSM platform to detect movement and/or changes in environmental conditions related to a real-world defined area, and use such information to create, define, and/or change a mapping property. Social media data may be available from an ARSM platform itself and/or from one or more third-party social media platforms. In one example, such data can be used by an ARSM platform to determine a social aspect related to a real-world defined area (e.g., to determine where people are gathering and/or one or more events taking place in an area) and the platform can use such data to create, define, and/or change a mapping property. Mobile telephone networks process various forms of data (e.g., location data from cell towers, connectivity data, etc.). In one example, such data can be used by an ARSM platform to determine information about people (e.g., location and/or density of people in a given area) and the platform can use such data to create, define, and/or change a mapping property. Satellites focusing one or more cameras and/or sensors at an area can obtain information about that area (e.g., imagery, environmental, etc.). In one example, such information can be used by an ARSM platform to determine information about an area (e.g., environmental, vegetation growth, water levels, buildings, etc.) and the platform can use such data to create, define, and/or change a mapping property related to the area. Cameras located in or near an area can be used to acquire information about the movement and location of objects and individuals in and through the area. In one example, such information can be used by an ARSM platform to determine a flow, density, and/or congestion of traffic and/or people and use such information to create, define, and/or change a mapping property related to the area. Weather data for an area is available from a variety of sources (e.g., governmental, organizational, etc.) and can be used to determine information about the area. In one example, such information can be used by an ARSM platform to determine a location of a weather pattern or event (e.g., a storm or severe weather event) and use such information to create, define, and/or change a mapping property related to the area. Access by an ARSM platform to any of the above information may be by any known and/or developed mechanism including, but not limited to, a contractual arrangement with an operator of relevant equipment, deploying relevant equipment by the platform, a network connection to a repository of such information, and any combinations thereof.

Figure 2:
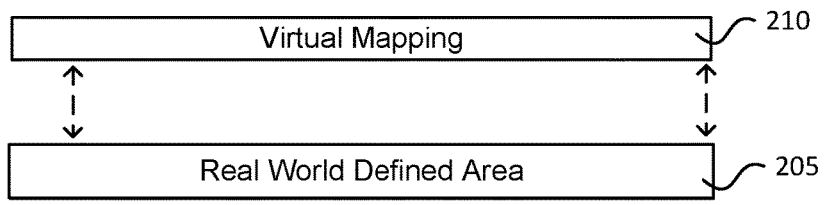
FIG. 2 illustrates an example diagrammatic representation of a cross section of an exemplary real-world defined area and a cross section of a corresponding virtual mapping of the real-world defined area.

FIG. 2 illustrates an example diagrammatic representation of a cross section of an exemplary real-world defined area 205 and a cross section of a corresponding virtual mapping of the real-world defined area 210. In one exemplary perspective, a virtual mapping, such as mapping 210, may be represented within an ARSM platform as a virtual overlay of a real-world defined area, such as area 205. Such a virtual overlay may have one or more representative elements within an ARSM platform that may be displayed via an augmented reality user interface of the ARSM platform to one or more users. Such a display of representative elements of a virtual mapping is not necessary in each implementation and will be understood in light of the full disclosure herein.

Figure 3:
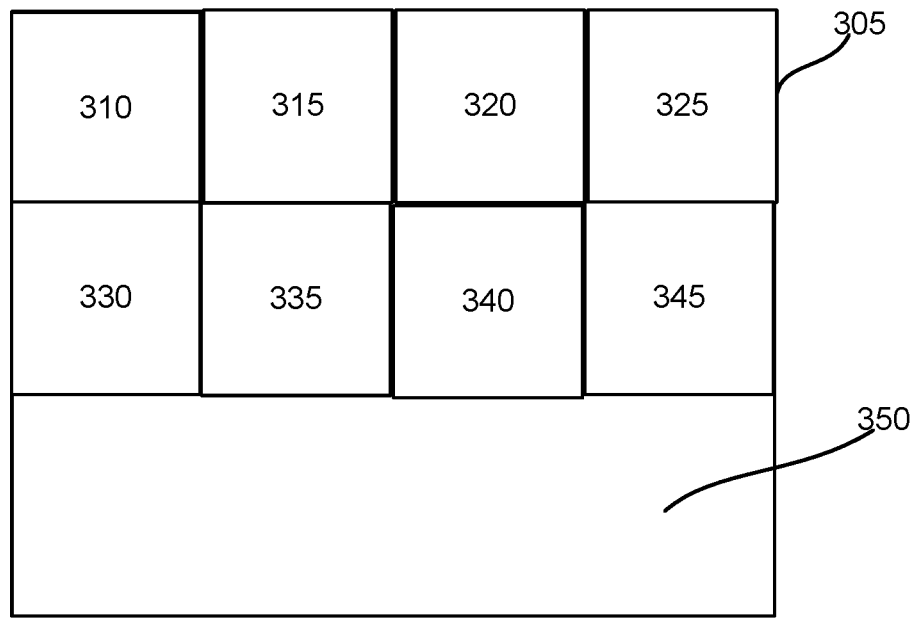
FIG. 3 illustrates an example diagrammatic representation of a virtual mapping of an exemplary real-world defined area looking downwardly upon the virtual mapping.

FIG. 3 illustrates an example diagrammatic representation of virtual mapping 305 of an exemplary real-world defined area looking downwardly upon the virtual mapping. Virtual mapping 305 includes virtual subdivisions 310, 315, 320, 325, 330, 335, 340, 345, each corresponding to a real-world subdivision of the real-world defined area mapped by virtual mapping 305. Virtual mapping 305 also includes a non-divided (i.e., not subdivided) area 350 (e.g., not yet subdivided, never subdivided, etc.).

Figure 4:
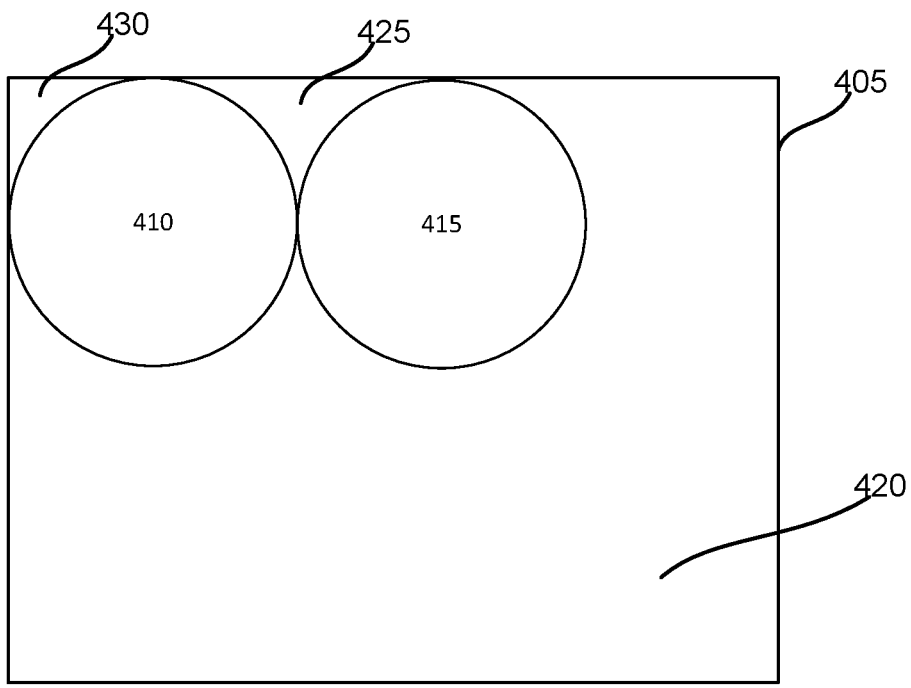
FIG. 4 illustrates another example diagrammatic representation of a virtual mapping of an exemplary real-world defined area looking downwardly upon the virtual mapping.

FIG. 4 illustrates an example diagrammatic representation of virtual mapping 405 of an exemplary real-world defined area looking downwardly upon the virtual mapping. Virtual mapping 405 includes virtual subdivisions 410, 415 each corresponding to a real-world subdivision of the real-world defined area mapped by virtual mapping 405. Virtual mapping 305 also includes a non-divided (i.e., not subdivided) area 420 (e.g., not yet subdivided, never subdivided, etc.). Virtual mapping 305 also includes a non-divided area 425 and a non-divided area 430, each formed by the space between the shapes of the virtual subdivisions 410, 415.

A virtual subdivision of a virtual mapping of a real-world defined area of an ARSM platform may be leasable to a user of the ARSM platform. When a virtual subdivision is leased to a user, the user may obtain one or more rights related to the virtual subdivision within the ARSM platform. Such a right may impact one or more other users when that user is utilizing the ARSM platform from a real-world location that is near or within a real-world subdivision of the real-world defined area represented by the virtual subdivision. Location of a user with respect to a real-world defined area, a real-world subdivision, and/or a virtual subdivision of an ARSM platform may be determined by any of a variety of known mechanisms for determining the location in the real-world of a user of a computing system. In one such example, an ARSM platform receives information about the location of a computer device being used by a user to access the ARSM platform (and, by inference, the location of the user) from the computer device and a location determining device of the computer device (e.g., a GPS or other location determinative system of a mobile phone computing device).

If a user of an ARSM platform leases a virtual subdivision, the ARSM platform tracks the assignment of the lease and the rights associated with the lease. In one such example, the ARSM platform assigns a virtual leasehold to one or more virtual subdivisions for the user and the virtual leasehold information stored by the ARSM platform includes the assignment and associated rights. In one example, a virtual leasehold is assigned to a single virtual subdivision at a time. In one such example, the virtual leasehold stays assigned to the same virtual subdivision. In another such example, the virtual leasehold may be reassigned to another virtual subdivision. In another example, a virtual leasehold is assigned to multiple virtual subdivisions at a time.

An ARSM platform may be configured to require payment by a user for one or more activities, such as leasing a virtual subdivision, renewing a virtual leasehold, accepting payment for a service, accepting payment for a product, and any combinations thereof. An ARSM platform may include a payment system. Such a payment system may be integrated into an ARSM platform or otherwise be connected to an ARSM platform (e.g., a third-party payment system connected to an ARSM platform, such as via one or more API's and/or networks). Example third-party payment systems include, but are not limited to, an automated clearing house (ACH) system, a credit card payment system, PayPal (www.paypal.com), Apple Pay, Stripe (www.stripe.com), Square (www.squareup.com), and any combinations thereof. A payment system could be used by an ARSM platform and/or its users for a variety of purposes including, but not limited to, allowing a user to submit a payment of a value for initiating and/or renewing a virtual leasehold, receiving a payment from a user related to initiating and/or renewing a virtual leasehold, allowing a user to submit a payment for a service and/or product (e.g., a real-world offering, discussed further below), receiving a payment from a user related to a service and/or product (e.g., a real-world offering), and any combinations thereof. Such a payment system may also provide additional services, such as managing leasehold activities, virtual store activities, and/or aspects related to real-world offerings. Further, an ARSM platform may include functionality (e.g., via one or more user interfaces) for analytics and reporting tools to allow users to manage information and aspects of a virtual leasehold, a virtual store, and/or real-world offerings (e.g., lease activity, performance metrics, inventory control, renewal deadlines, lease history, occupancy rate, and/or revenue generation). Still further, an ARSM platform may include a dispute resolution functionality (e.g., via one or more user interfaces). Such a dispute resolution functionality can be configured to manage and/or resolve disputes related to a virtual subdivision (e.g., a dispute between users attempting to lease the same virtual subdivision/virtual leasehold and/or other disputes related to a virtual subdivision, virtual leasehold, virtual store, or other aspect of an ARSM platform). Example mechanisms for dispute resolution include, but are not limited to, a bidding process, a lottery system, a reporting system for complaints, a ranking system to receive information about a conflict, and any combinations thereof.

A user's eligibility to secure and maintain a virtual leasehold may be limited by the ARSM platform. In one example, a user of an ARSM platform may only secure a virtual leasehold if the user is identified within the ARSM platform as being affiliated with a real-world organization that controls the real-world defined area for which the virtual mapping includes the virtual subdivision to which the leasehold would be assigned.

In one such example, the ARSM platform includes a database (or a connection to such a database) that includes a listing of real-world people who are affiliated with the real-world organization that controls a real-world defined area (e.g., those currently affiliated). When a user requests a leasehold to a particular virtual subdivision, an identifier of the user's real-world identity (e.g., an identifier previously or currently input to the ARSM platform by the user) is compared against the listing of real-world people affiliated with the real-world organization. If the correlation is positive, the user may be allowed to be assigned a leasehold to a virtual subdivision corresponding to a real-world subdivision that is controlled by the relevant real-world organization. If the correlation is not positive (i.e., the user is not currently affiliated with the real-world organization), the user is denied a leasehold to a virtual subdivision corresponding to a real-world subdivision that is controlled by the relevant real-world organization.

An ARSM platform may be configured such that a user of an ARSM platform who is also identified within the ARSM platform as being affiliated with a real-world organization (e.g., a real-world organization that controls a relevant real-world area or subdivision to a particular activity on the platform) can participate in a particular activity on the platform (i.e., users not affiliated with the real-world organization are prevented from the particular activity. Examples of activities that can be given preferential treatment to a user affiliated with a real-world organization include, but are not limited to, participating in an event; purchasing, leasing, renting a real-world offering (e.g., an event ticket, product, etc.); and any combinations thereof. In one example, an activity, event, and/or virtual store may be occurring in or near a virtual subdivision or other area that is related to an organization (e.g., the organization controls the real-world area correlating to the virtual subdivision, the organization is assigned the leasehold to the virtual subdivision, the organization is sponsoring an event within the real-world subdivision or corresponding virtual subdivision, the organization is sponsoring a virtual store within the virtual subdivision) and one or more of the activities, the event, and/or a real-world offering related to the virtual subdivision is limited to only users affiliated with that organization.

The term "control" when used in relation to a real-world organization and a real-world defined area and/or real-world subdivision means that the real-world organization exerts a controlling factor over the area. A controlling factor includes owning an interest in the real-world defined area, leasing an interest in the real-world defined area, having license to the real-world defined area, having an ability to physically limit access to people to the real-world defined area, and/or having an ability to legally limit access to people to the real-world defined area.

The term "affiliated" when used in relation to a person's relationship to a real-world organization means whatever the real-world organization determines is a proper relationship to the organization (e.g., as determined by the ARSM platform and/or its operator by the fact that the real-world organization provides the listing of individuals that are "affiliated").

The time period of the length of a virtual leasehold and/or a user's ability to maintain a virtual leasehold assigned to a particular virtual subdivision may be limited by the ARSM platform. In one example, a user of an ARSM platform may only maintain a virtual leasehold during the time that the user is identified within the ARSM platform as being affiliated with a real-world organization that controls the real-world defined area for which the virtual mapping includes the virtual subdivision to which the leasehold would be assigned. In one such example, a leasehold is assigned an initial period of time that corresponds to a time period provided by the relevant real-world organization for a typical term of affiliation (e.g., a semester of a course of study at an educational institution).

In one such example, the ARSM platform includes a database (or a connection to such a database) that includes an indication of the length of time a person is scheduled to be affiliated with the real-world organization that controls a real-world defined area (e.g., those currently affiliated). The ARSM platform may utilize the information regarding time period of affiliation to determine a time period for an assignment of a virtual leasehold. In one example, an ARSM platform may check the listing discussed above of current affiliation on a periodic basis to confirm that the user is still currently affiliated and is eligible to maintain a virtual leasehold. If the time period for expected affiliation has not expired and/or a periodic check of a current affiliation determines current affiliation of a user with the relevant real-world organization, an ARSM platform may maintain an assignment of a leasehold to a corresponding virtual subdivision. If the time period for expected affiliation has expired and/or a periodic check of a current affiliation determines no current affiliation of a user with the relevant real-world organization, an ARSM platform may discontinue an assignment of a leasehold to a corresponding virtual subdivision.

Various database systems are known and can be operated by the ARSM platform and/or an organization controlling a real-world area. Such database systems (e.g., a DBSM or database management system) can be accessed (e.g., via an API and/or network connection) by an ARSM platform. Choice of a database system may depend on factors such as the size and complexity of the data/information being managed, a performance requirement, a cost consideration, and/or other factors particular to the given ARSM platform and/or controlling organization. Example database systems include, but are not limited to, MySQL, PostgreSQL, Microsoft SQL, Oracle database, and any combinations thereof. A database system and/or a corresponding ARSM platform may include functionality (e.g., data validation functionality, synchronization functionality) for keeping information of affiliation and controlling organizations up to date (e.g., via periodically synchronizing information of an organization's membership information with an ARSM's database information, such as user information). In one example where an ARSM platform needs to check for affiliation of a user with an organization, information can be stored (e.g., in one or more databases of the ARSM platform and/or one or more databases of an organization) related to one or more real-world defined areas relevant to the ARSM platform, one or more organizations that control a real-world defined area, and one or more users affiliated with each of the one or more organizations. In such an example, when a user's location is determined and the user is requesting (and/or the platform is updating) a virtual leasehold assignment, the ARSM platform can access the relevant database to determine if the user is within a real-world defined area that is controlled by an organization and if the user is affiliated with such organization.

An organization that controls a real-world defined area may utilize a third-party identity provider to allow its members to authenticate to other entities (e.g., an ARSM platform). Examples of third-party identity providers (IDP's) include, but are not limited to, Google IDP, Facebook IDP, and Microsoft IDP. In such a case, an ARSM platform may be configured to allow a user to authenticate to the ARSM platform using an IDP that includes information from a relevant organization that can be utilized by the ARSM platform to confirm that a user is affiliated with the organization.

A real-world organization may be any organization legally or otherwise identifiable that controls an area in the real-world corresponding to a real-world defined area of an ARSM platform according to the current disclosure. Examples of a real-world organization include, but are not limited to, an educational institution (e.g., an educational entity selected from the group consisting of a university, a college, an academy, a public school, a private school, an elementary school, a secondary school, a vocational school), a sporting organization (sports franchise, an amateur sporting entity, a professional sporting entity, a club sporting entity, a sports facility entity, a sporting fan group), a retail organization (e.g., a preferred shopper program), a real estate development organization, a shopping mall, and any combinations thereof. In one example, a real-world organization is an educational institution. In one such example, the real-world defined area is a campus of the educational institution.

It is contemplated that multiple users of an ARSM platform may each lease and be assigned a leasehold that is assigned to a different virtual subdivision of the ARSM platform.

An assignment of a virtual leasehold that is assigned to a first virtual subdivision of a virtual mapping of a real-world defined area corresponding to a first real-world subdivision may be reassigned to a second virtual subdivision of the virtual mapping corresponding to a second real-world subdivision. Such a reassignment may be initiated by a request of the user to which the virtual leasehold is assigned, by an ARSM platform automatically, by the operator of an ARSM platform, or by some other initiating factor. A reassignment may be temporary (e.g., reassigned temporarily to the second virtual subdivision before being reassigned back to the first virtual subdivision or to a third virtual subdivision). In one such example, multiple virtual leaseholds (e.g., those assigned to different users) are rotated (e.g., on a periodic basis, based on a reassignment criteria, etc.) around a set of virtual subdivisions. Prior to reassigning a virtual leasehold to a different virtual subdivision a check of the eligibility of a user assigned to the virtual leasehold to lease a particular virtual subdivision may occur (see above).

Reassignment may be initiated (and/or the location of the new virtual subdivision to which reassignment occurs) based on multiple factors and criteria. Example reassignment criteria for use in reassignment include, but are not limited to, a setting in the augmented reality social media platform by one or more additional users of the augmented reality social media platform, a setting in the augmented reality social media platform by the first user, a setting in the augmented reality social media platform by the second user, a setting in the augmented reality social media platform by the third user, a recipient setting, a leasehold setting of the first leasehold, an input by the first user, an input by the third user, an offering marketing criteria input to and/or determined by the augmented reality social media platform, a random reassignment schedule, a predetermined reassignment schedule, a current weather condition for the first real-world subdivision, a predicted weather condition for the first real-world subdivision, a current weather condition for the second real-world subdivision, a predicted weather condition for the second real-world subdivision, a time period in a calendar year, a calendar season, a user engagement level within a real-world subdivision and/or corresponding virtual subdivision, a user activity level within a real-world subdivision and/or corresponding virtual subdivision, an availability of one or more virtual resources within a virtual subdivision, an availability of one or more features within a virtual subdivision, feedback data provided by a user regarding a virtual subdivision or a related element, a rating provided by a user regarding a virtual subdivision or a related element, proximity to other users within a virtual subdivision, a user demographic characteristic, an availability of a real-world event or activity in a vicinity of a real-world subdivision, a historical usage pattern of a virtual subdivision, a user location within a real-world subdivision, a user movement pattern within a real-world defined area, an availability of network connectivity within a real-world subdivision, an availability of user network bandwidth within a real-world subdivision, a seasonal theme or promotion of a virtual subdivision, a holiday theme or promotion of a virtual subdivision, and any combinations thereof.

For example, in one exemplary implementation a decision by a platform to make a reassignment and/or to which other virtual subdivision to assign a given virtual leasehold may be influenced by a dynamic interplay data representing one or more user preferences (e.g., data collected by the platform indicating a preference, a recipient setting, a leasehold setting, another type of setting, etc.), one or more environmental factors, and/or one or more platform considerations. For example, if one or more users express preference(s) (e.g., via behaviors of interacting with the platform and/or settings) for a different location or if there is a consensus among users within the augmented reality social media platform, the platform may track such information and may trigger a reassignment (e.g., upon such preference reaching a predefined setting or some other threshold. Additionally, weather conditions, both current and predicted, as well as seasonal and holiday themes, may impact such a decision to reassign a virtual leasehold to a different virtual subdivision. For example, a real-world subdivision might become less attractive during unfavorable weather conditions (e.g., tracked by the platform as less interaction with the virtual leasehold, such as via fewer virtual store interactions, during such times historically), prompting a move to a more favorable location. Further, one or more levels of user engagement and activity within a real-world subdivision and its corresponding virtual counterpart may be considered by the platform. For example, if a particular area experiences a decline in user activity, reassignment may occur to maintain a vibrant virtual community. Still further, an availability of one or more virtual resources (e.g., a virtual indicator of an object, a real-world offering, a product, etc.) and features within a virtual subdivision may be a factor that a platform may utilize to make a decision of whether to reassign a virtual leasehold and/or to where to make such reassignment. For example, if certain features or resources become unavailable or if there is a desire to introduce new such elements, such information may be a factor in a reassignment determination. Yet further, feedback and/or ratings (e.g., those related to a virtual leasehold, one or more real-world offerings thereof, other objects associated with a virtual leasehold or virtual subdivision, etc.) provided by one or more users regarding a virtual subdivision or related elements may contribute to a decision-making process by a platform's processing. For example, negative feedback or low ratings may lead to reassignment (e.g., to improve user satisfaction in one form or another). Still yet further, environmental factors such as proximity to other users, network connectivity, and user movement patterns within a real-world defined area may be tracked by a platform's infrastructure and considered by the platform in making a decision regarding reassignment (e.g., to optimize user interactions and/or connectivity). Also, certain promotional and/or event considerations, such as a seasonal theme, a promotion, and/or an availability of real-world events or activities in the vicinity of a real-world subdivision (and its corresponding virtual counterparts and leasehold(s)) can be considered by a platform and/or influence a platform's decision regarding reassignment. For example, aligning virtual subdivisions and/or a location of a virtual leasehold with ongoing one or more events or promotions may enhance user engagement. Any combination of one or more considerations/factors discussed in this paragraph may also be utilized by a platform in making a reassignment decision. It is also contemplated that similar considerations and combinations thereof may be utilized by a platform in making a decision related to a reallocation of a real-world offering from one leasehold to another leasehold (as discussed elsewhere in this disclosure).

An ARSM platform may include one or more user settings related to a reassignment criteria (e.g., one or more settings to allow a user to specify a preference related to a criteria for virtual leasehold reassignment). For example, a platform may include one or more user settings that present to a user (e.g., via a user interface) an option to set a preference related to location, weather, season, etc. that are used by an ARSM platform in determining a reassignment of a virtual leasehold from one virtual subdivision to another. An ARSM platform may utilize data analysis and processing tools to collect, analyze, and process data related to one or more reassignment criteria. In one such example, such tools and data can be used by a platform to identify one or more patterns or trends that can be used in a reassignment decision or process of a virtual leasehold to a different virtual subdivision. In one example of a data analytic tool, an ARSM platform may include one or more machine learning and/or artificial intelligence functionalities that can be used to analyze data related to a reassignment criteria and/or a reassignment criteria itself. In one such example, such a tool may analyze data related to a reassignment criteria to make one or more predictions related to such criteria and reassignment of a virtual leasehold to a different virtual subdivision. In another such example, such a tool may analyze data related to a user behavior, a user preference, and/or a user activity to predict one or more virtual subdivisions that are likely to be more effective (e.g., more popular to one or more users of a platform) for a given virtual leasehold at a particular time (e.g., a particular time of day, week, month, year).

An ARSM platform may utilize user location related criteria in determining if a virtual leasehold is to be reassigned to a different virtual subdivision (e.g., in combination with one or more other criteria). In one exemplary aspect, geolocation technology (e.g., geolocation devices of a user computing device coupled with network processing of such information) can be used by an ARSM platform to track user location (e.g., in real-time) and use such data to determine when a user enters and/or leaves a virtual subdivision. This information may be correlated with similar information of one or more other users (e.g., in combination with one or more predefined rules) in a determination of a virtual leasehold reassignment.

One or more user interfaces may be included with and/or in conjunction with an augmented reality user interface of an ARSM platform to interact with a user (e.g., a user to which a virtual leasehold is assigned, a user interacting with a particular virtual leasehold) related to a reassignment of a virtual leasehold. Example interactions of a user interface include, but are not limited to, a display of a map showing a current assignment of a virtual leasehold to a virtual subdivision, a display of a map showing a prospective reassignment of a virtual leasehold to a virtual subdivision, a display of a criteria being used for reassignment, and any combinations thereof. In one example, a user is presented a user interface showing a map of one or more virtual leaseholds assigned to that user (e.g., with each virtual leasehold shown assigned to a current virtual subdivision and, optionally, one or more possible reassignable virtual subdivisions to which a virtual leasehold may be reassigned). In another example, a user interacting in an ARSM platform with a virtual leasehold is presented with one or more user interfaces indicating to the user that the virtual leasehold is being (or has already been) reassigned to a different virtual subdivision.

A recipient setting is a setting made in a user interface of an ARSM platform by a user to govern interactions where the user (a "recipient user") is the user interacting with a given virtual subdivision by being near or within the corresponding real-world subdivision area (e.g., a user interacting with augmented reality objects presented in a user interface while physically located in or near a real-world subdivision). Examples of a recipient setting include, but are not limited to, a minimum distance from a recipient user to a virtual subdivision, a maximum distance from the recipient user to a virtual subdivision, a demographic characteristic of a virtual leasehold or its assignee, a demographic characteristic of the recipient user, a sales volume of a real-world offering, an availability of a real-world offering, a popularity of a real-world offering, a sales volume of a virtual store of a virtual leasehold, an availability of a product of a virtual store of a virtual leasehold, a popularity of a product of a virtual store of a virtual leasehold, a popularity of a virtual store of a virtual leasehold, a popularity of a virtual leasehold, a popularity of a virtual subdivision, a promotional status of a virtual store of a virtual leasehold, an input of a specific desired product, an input of a favorited product, an input of a favorited virtual store of a virtual leasehold, an input of a favorited virtual leasehold, an input of a favorited virtual subdivision, a time period of existence of a virtual leasehold, a time period of existence of a virtual store of a virtual leasehold, a user's preferred language, a user's preferred currency, a user's history of purchases from a virtual store of a virtual leasehold, a user's physical address (e.g., home, origin, school, etc.), a demographic characteristic of a user, a user's preferred payment method, a user's preferred delivery method, a user social media setting, and any combinations thereof.

A leasehold setting is a setting input via a user interface of an ARSM platform and associated with an aspect of a particular virtual leasehold (e.g., by input of a user that is authorized by the user assigned the leasehold or the user assigned the leasehold themselves) that is designed to govern the interaction of other users with the virtual leasehold or a virtual subdivision to which the virtual leasehold is assigned at the time. Examples of a leasehold setting include, but are not limited to, a minimum distance from a recipient user to a virtual subdivision, a maximum distance from the recipient user to a virtual subdivision, a demographic characteristic of a virtual leasehold or its assignee, a demographic characteristic of the recipient user, a sales volume of a real-world offering, an availability of a real-world offering, a popularity of a real-world offering, a sales volume of a virtual store of a virtual leasehold, an availability of a product of a virtual store of a virtual leasehold, a popularity of a product of a virtual store of a virtual leasehold, a popularity of a virtual store of a virtual leasehold, a popularity of a virtual leasehold, a popularity of a virtual subdivision, a promotional status of a virtual store of a virtual leasehold, an input of a specific desired product, an input of a favorited product, an input of a favorited virtual store of a virtual leasehold, an input of a favorited virtual subdivision, a time period of existence of a virtual leasehold, a time period of existence of a virtual store of a virtual leasehold, a list of designated customers, a type of real-world business or service provided associated with a leasehold, availability of staff and/or employees at the virtual leasehold, a type of virtual product and/or service offered by or in relation to a virtual leasehold, a type of virtual and/or real-world promotion and/or discount offered by or in relation to a virtual leasehold, a type of virtual and/or real-world contest and/or giveaway offered by or in relation to a virtual leasehold, a customer rating setting, a customer review setting, a product and/or service compatibility setting, a social media engagement setting, and any combinations thereof.

A designated customer is a user of the ARSM platform that has been designated by a user to which a virtual leasehold is assigned to have one or more special characteristics and/or to have special consideration with respect to interactions with the virtual leasehold or the virtual subdivision to which the virtual leasehold is assigned.

A demographic characteristic is a characteristic inherent to a user and/or an object associated with a user within an ARSM platform. Examples of a demographic characteristic include, but are not limited to, a race status, a gender, a sex, an age (and/or age range), a minority status, an interest of a user, a hobby of a user, an occupation of a user, an industry of a user, an educational level and/or degree of a user, an income level, a spending habit, a sexual orientation, a course of study of an individual, an enrollment status of an individual in a particular course, an enrollment status of an individual in a real-world organization, a density of people traversing a particular area of a real-world defined area, a density of people traversing a real-world subdivision, and any combinations thereof.

Examples of an availability of a real-world offering and/or real-world product includes an availability including, but not limited to, an availability within a set period of time, a current availability, a scheduled availability, and any combinations thereof.

Examples of an offering marketing criteria include, but are not limited to, a demographic characteristic of one or more people that move across or near the second real-world subdivision, a demographic characteristic of one or more people that move across or near the first real-world subdivision, a demographic characteristic of one or more people predicted to move across or near the second real-world subdivision, a demographic characteristic of one or more people predicted to move across or near the first real-world subdivision, a demographic characteristic of one or more people scheduled to move across or near the second real-world subdivision, a demographic characteristic of one or more people scheduled to move across or near the first real-world subdivision, and any combinations thereof.

An ARSM platform may detect and monitor the movements of users and other individuals within a real-world defined area (and any of its sub areas) using a variety of mechanisms. Such mechanisms include, but are not limited to, GPS technology (e.g., of a user's computing device), geofencing technology, facial recognition technology, a Bluetooth beacon, social media information, a mobile device tracking application, and any combinations thereof. In one example, geofencing technology can be used by an ARSM platform to track when a person enters, exits, or otherwise traverses an area (e.g., a virtual subdivision), such as via a mobile application of the person and GPS technology. In another example, facial recognition technology (e.g., in combination with one or more cameras and/or optical sensors located in or near a real-world defined area, such as a camera of a user's computing device) can be utilized by an ARSM platform to detect, identify, count, and/or otherwise track one or more persons in or near a real-world defined area (or a sub area thereof). In one such example, such captured information can be used in combination with other information (e.g., information stored by an ARSM platform, information provided by a third-party) to identify a known individual. In still another example, one or more Bluetooth beacons can be positioned in or near a real-world defined area (or sub area thereof) and used to detect signals from computing devices of people who enter, exit, or otherwise traverse an area (e.g., people with Bluetooth enabled devices). In yet another example, a person may have opted into an application program that tracks their location and that person enters, exits, or otherwise traverses an area of a real-world defined area. In one such example, an ARSM platform may access information from such an application program (e.g., via third-party contractual arrangements). In still yet another example, an ARSM platform may access the social media information (e.g., from the ARSM platform itself and/or from one or more third party social media platform(s)), such as information related to the person's interaction with a real-world defined area and posts the person makes related to the same. In any of the above examples, demographic and location information can be collected on such people (e.g., via their connected computing device, via optical analysis of images captured via one or more cameras associated with facial recognition or other sensors located in or near a real-world defined area, via opt in applications, via one or more user interfaces presented to a user of an ARSM platform, via stored information about a user of an ARSM platform, etc.) and utilized by the ARSM platform for any aspect of the platform as would be understood from the disclosure herein. Combinations of two or more of the above examples are contemplated.

An ARSM platform may be configured to allow for a user assigned a virtual leasehold to transfer the virtual leasehold to another user. Such a transfer may be limited by an ARSM platform. Examples of a limit on transfer of a virtual leasehold include, but are not limited to, allowing transfer only at a given time (e.g., when a user leaves the corresponding platform, when a user is no longer affiliated with an organization controlling a real-world area and such affiliation is a requirement, during an predetermined transfer period), allowing transfer to only select other users (e.g., where affiliation with an organization is required limiting to other affiliated users), allowing transfer only upon payment of an amount to the ARSM platform (e.g., a transfer fee, a payment for leasing a virtual leasehold, etc.), and any combinations thereof.

An ARSM platform may include blockchain technology for use in storing and managing information related to assignment of a virtual leasehold, such as assignment of a virtual leasehold to a particular virtual subdivision, assignment of a virtual leasehold to a particular user, reassignment of a virtual leasehold to a different virtual subdivision, data related to a virtual leasehold, reassignment of a virtual leasehold to a different user, and any combinations thereof. In one exemplary aspect, use of a blockchain technology may provide a way to ensure fair, trustworthy, and/or transparent treatment of virtual leaseholds to a platform's users (e.g., via a unique and/or non-fungible tracking of a virtual leasehold asset). In another exemplary aspect, use of a blockchain technology may be utilized to manage a transfer of a virtual leasehold from one user to another user.

An ARSM platform may include a functionality for implementing a virtual contract (e.g., a smart contract) between users and/or between a user and the platform. Such a virtual contract may assist with managing one or more aspects of a virtual leasehold including, but not limited to, initiation of a virtual leasehold, renewal of a virtual leasehold, termination of a virtual leasehold, terms and conditions of a virtual leasehold, reassignment of a virtual leasehold to a different virtual subdivision, reassignment of a virtual leasehold to a different user, binding a user to terms and conditions of a virtual leasehold, applying one or more conditions or terms of a virtual leasehold, and any combinations thereof. One or more aspects of a virtual contract may be automatically triggered in an ARSM platform when a user (e.g., a user assigned a virtual leasehold, a user interacting with a virtual leasehold) when the user enters a virtual subdivision corresponding to the relevant virtual leasehold.

An ARSM platform according to the current disclosure may include any number and type of rights that come with a particular leasehold. In one exemplary aspect, a right associated with a virtual leasehold may be a right that augments the ability of the user to which the virtual leasehold is assigned to interact with other users and/or the assigned virtual subdivision (along with objects associated therewith. In another exemplary aspect, a right associated with a virtual leasehold may be a right that augments the ability of other users to interact with a virtual leasehold, an assigned virtual subdivision, and/or objects associated therewith. Examples of a right that may be assigned within a ARSM platform to a virtual leasehold include, but are not limited to, a right to provide one or more virtual offerings to other users in a virtual subdivision to which the virtual leasehold is assigned, a right to operate a virtual store in a in a virtual subdivision to which the virtual leasehold is assigned, a right to post virtual objects in a virtual subdivision to which the virtual leasehold is assigned, a right to limit other users in the number and/or type of virtual objects the other users may post in a virtual subdivision to which the virtual leasehold is assigned, a right to access and/or control a specific object and/or subarea within a virtual subdivision, a right to collect payment (e.g., real-world currency, virtual currency, a virtual reward, etc.) within a virtual subdivision to which the virtual leasehold is assigned, a right to initiate and/or participate in a virtual event and/or activity within a virtual subdivision to which a virtual leasehold is assigned, a right to set and enforce one or more rules or regulations within a virtual subdivision to which a virtual leasehold is assigned, a right to initiate and/or receive a notification and/or alert related to an activity within a virtual subdivision to which a virtual leasehold is assigned, a right to transfer a virtual leasehold to another user within a corresponding platform, a right to sublet a portion of a virtual leasehold to another user within a corresponding platform, and any combinations thereof.

An ARSM platform according to the current disclosure includes one or more user interfaces for interacting with users of the ARSM platform. At least one of the one or more user interfaces includes an augmented reality user interface. An augmented reality user interface includes a display of a portion of the real-world and a display of one or more virtual objects. In one example of an ARSM platform, an augmented reality user interface includes a display of a portion of the real-world in the proximity of the computing device used by a first user and a display of one or more objects associated with a virtual leasehold or other aspect of the ARSM platform. In one such example, the still and/or video image of the real-world proximity is obtained via an optical device (e.g., a camera) of the computing device of the first user and the one or more virtual objects are overlaid on the still and/or video image of the real-world proximity in the augmented reality user interface displayed to the first user. In another example of an ARSM platform, an augmented reality user interface includes a display of one or more virtual objects associated with a virtual leasehold or other aspect of the ARSM platform that are overlaid upon a real time view of a real-world proximity to a device of a first user of the ARSM platform (e.g., a view obtained through an eyeglass of an augmented eyeglass device, a view surrounding a holographic display device that projects the one or more virtual objects into three space in the real-world proximity).

An ARSM platform (or other digital platform) may include a functionality that allows a first user of the platform to access the still and/or video image of the real-world proximity obtained via a second computing device of a second user of the platform (e.g., via a camera element of the second computing device) via one or more user interfaces presented to the first user via the first user's computing device. One such functionality allows a first user to submit a request via a specific user request interface to a second user (e.g., a contact, a user met via the platform, etc.) to share their real-world images from the second user's computing device (e.g., captured via a camera element) so that such images can be displayed (e.g., in an augmented reality user interface) of the ARSM platform to the first user via the first user's computing device. In another implementation, a second user may initiate sharing of a real-world image from their device to a first user (e.g., via a user interface actuated by the second user. In one example: a first user navigates to a desired location of an ARSM platform, the first user actuates a user interface to allow a second user (or multiple other users) to view their location, the second user receives an indication of the sharing of first user's view, the second user selects a user interface option to view the first user's view from the first user's device, the first user's computing device captures one or more images (still and/or video) of the real-world area proximate the first user, the ARSM platform receives the one or more images and communicates them (e.g., in real time) to the second user's computing device, and the second user is presented the one or more images in one or more user interfaces of the ARSM platform (e.g., in an augmented reality user interface showing the one or more real-world images and virtual representations of the ARSM platform, such as the virtual mappings corresponding to the relevant real-world area captured by the one or more images).

An augmented reality user interface may include any number or type of virtual objects displayed with a real-world view/image of a proximity (e.g., a proximity of a real-world area, including a particular real-world subdivision to which a virtual subdivision of a virtual mapping may correlate). One type of virtual object is a virtual indicator of a leasehold. A virtual indicator of a leasehold is a virtual object that is associated with a leasehold and can be displayed in a portion of an augmented reality user interface display that corresponds to the virtual subdivision to which the virtual leasehold is currently assigned. Examples of a virtual indicator of a virtual leasehold include, but are not limited to, an indicator of a virtual store associated with a virtual leasehold, a sign, a logo, an image, a border indicator corresponding to a border of a virtual subdivision to which a virtual leasehold is assigned, a color graphic indicator overlay corresponding to the area of a virtual subdivision to which a virtual leasehold is assigned, a virtual object representing a real-world offering provided by the virtual leasehold, and any combinations thereof.

The viewability of a virtual indicator or other virtual object may be limited within an ARSM platform by a visibility limiting factor/setting. An example of a visibility limiting factor/setting includes, but is not limited to, a recipient setting (see above), a leasehold setting (see above), a location of a user in the real-world to a real-world subdivision corresponding to a virtual subdivision to which a virtual leasehold is assigned, and any combinations thereof. In one example, the viewability of a virtual indicator or other virtual object within an augmented reality user interface of an ARSM platform is limited to when a user viewing the user interface is physically located in the real-world within a real-world subdivision corresponding to a virtual subdivision to which the virtual leasehold for the virtual indicator or other virtual object is assigned. In another example, the viewability of a virtual indicator or other virtual object within an augmented reality user interface of an ARSM platform is limited to when a user viewing the user interface is physically located within a preset distance in the real-world from a real-world subdivision corresponding to a virtual subdivision to which the virtual leasehold for the virtual indicator or other virtual object is assigned.

A real-world offering is an offering presented to a user in an augmented reality user interface of a ARSM platform of the current disclosure wherein the offering is for some object, service, participation, or other thing in the real-world (e.g., augmented by use of the ARSM platform). A real-world offering may be assigned to a virtual leasehold and/or a virtual subdivision (e.g., directly assigned to a virtual subdivision, indirectly assigned to a virtual subdivision via a virtual leasehold). A real-world offering may be represented by a virtual indicator of a leasehold and/or other virtual object. Examples of a real-world offering include, but are not limited to, a product for sale, a service for sale, a product offering, a service offering, a promotional item, a recruiting item, an event item, a discount coupon (e.g., a general discount, a discount for a particular product or service), a voucher (e.g., a general voucher, a voucher related to a specific product or service), an item related to a loyalty program, a reward (e.g., a frequent customer reward), access to an event (e.g., an exclusive event or experience), a virtual tour of a property or other location, an interactive game (e.g., a game or challenge related to a product or service), a virtual try-on of a product, a virtual demonstration of a product, an informational content (e.g., a tutorial, an educational material), an opportunity to donate (e.g., donation to a particular cause or organization), an opportunity to sponsor an entity, an opportunity to provide a recommendation (e.g., to an operator of a virtual leasehold), a personal recommendation to a user (e.g., based on a user's preference and/or behavior within an ARSM platform), and any combinations thereof.

Any one or more real-world offerings may be assigned to a virtual subdivision (e.g., via a virtual leasehold, a virtual store of a virtual leasehold). One or more real-world offerings may be included in a set of real-world offerings (e.g., organized as an inventory list). Any one or more real-world offerings may be reassigned to a second virtual subdivision or other leasehold. Such a reassignment may occur without unassigning it to its original virtual subdivision or virtual leasehold. Such a reassignment may be temporary. A reassignment may be based on any number or type of criteria. Examples of a reassignment criteria include, but are not limited to, a setting in the augmented reality social media platform by one or more additional users of the augmented reality social media platform, a setting in the augmented reality social media platform by the first user, a setting in the augmented reality social media platform by the second user, a setting in the augmented reality social media platform by the third user, a setting in the augmented reality social media platform by the fourth user, a recipient setting, a leasehold setting of the first leasehold, a leasehold setting of the second leasehold, an input by the first user, an input by the third user, an offering marketing criteria input to and/or determined by the augmented reality social media platform, a random reassignment schedule, a predetermined reassignment schedule, a current weather condition for the first real-world subdivision, a predicted weather condition for the first real-world subdivision, a current weather condition for the second real-world subdivision, a predicted weather condition for the second real-world subdivision, a time period in a calendar year, a calendar season, and any combinations thereof. Examples of a marketing criteria include, but are not limited to, a demographic characteristic of one or more people that move across or near the second real-world subdivision, a demographic characteristic of one or more people that move across or near the first real-world subdivision, a demographic characteristic of one or more people predicted to move across or near the second real-world subdivision, a demographic characteristic of one or more people predicted to move across or near the first real-world subdivision, a demographic characteristic of one or more people scheduled to move across or near the second real-world subdivision, a demographic characteristic of one or more people scheduled to move across or near the first real-world subdivision, and any combinations thereof.

A virtual leasehold may include a right to establish a virtual store. A virtual store may offer any real-world offering or virtual offering for sale to users of the corresponding ARSM platform. Virtual objects and virtual indicators associated with a virtual leasehold may be viewable as discussed above to other users of the ARSM platform who may interact with such objects and indicators by selection in a corresponding augmented reality user interface. A virtual store may be reassigned from one virtual subdivision to another along with its corresponding virtual leasehold as discussed above.

A digital platform, such as an ARSM platform, may include and/or otherwise utilize any of a variety of technologies to assist in the generation of a virtual store (as well as other virtual objects and displayable elements, and related user interfaces). Examples of such technologies include, but are not limited to, an augmented reality content creation tool (e.g., Unity3D by Unity Technologies; Snapchat Lens Studio by Snap, Inc.), a computer vision technology (e.g., NVIDIA Deep Learning AI by NVIDIA Corporation; OpenCV Open Source Computer Library originally authored by Intel Corporation and others), an object recognition technology (e.g., Google Cloud Vision API by Google; Vuforia by PTC, Inc.), a mobile computing device with augmented reality functionality (e.g., an Apple iPhone with ARKit; a Samsung Galaxy smartphone with ARCore technology), a cloud-based augmented reality platform (including related technology tools) (e.g., Microsoft Azure Mixed Reality Services by Microsoft Corporation; Amazon Sumerian by Amazon Web Services), three-dimensional (3D) modeling software (e.g., Autodesk Maya by Autodesk, Inc.; Blender open source software originally developed by NeoGeo), an integrated payment system (e.g., Square by Block, Inc.; PayPal integrated payment services), a third-party payment system (e.g., a cloud-based payment system connected to a platform via one or more API's) (e.g., Stripe by Stripe, Inc.; Braintree by PayPal, Inc.), an interactive display element (e.g., a Samsung Interactive Display; an LG OLED touch display), other software creation tools (e.g., Adobe Creative Cloud Suite by Adobe Systems; Unreal Engine by Epic Games, Inc.), and any combinations thereof. Examples of each of these technologies are known.

In one exemplary aspect, an augmented reality content creation tool may be used to create and design virtual objects (e.g., a 3D virtual object representing a product for sale) and environments (e.g., a virtual store infrastructure, a virtual store décor presentation, a virtual representation of a real-world defined area, a virtual subdivision, etc.). In another exemplary aspect, a computer vision technology and/or an object recognition technology may be used to identify and track real-world objects, which can be used as a marker to anchor a virtual object and/or a store location, in an augmented reality platform. For example, products for sale in a virtual store may have virtual objects created by an ARSM platform using one or more computer vision and/or object recognition technologies. In yet another exemplary aspect, a cloud-based augmented reality platform (and/or related tools) may be used to build and manage augmented reality experiences (such as those described herein, including virtual stores and other virtual leasehold experiences/interactions by users), across multiple devices and locations. In still another exemplary aspect, a 3D modeling technology and/or related software can be used to create and design virtual objects (such as a product of a virtual store or other virtual objects and display elements) and environments. For example, one or more virtual products and/or store display elements may be generated and made displayable via a user interface of an ARSM platform with the use of one or more 3D modeling technologies. In still yet another exemplary aspect, an ARSM platform may include a payment system (integrated directly into the platform and/or connected via a network (and related API or other programming) to a third-party payment system) that can be utilized by users of the platform to make and receive payments related to a virtual leasehold. For example, a user visiting a virtual store may use a payment system to make a payment to the owner of the virtual store for buying a product associated with the virtual store.

A virtual indicator of a virtual leasehold or other virtual object may be associated with a pop up graphic that when the virtual indicator or other virtual object is interacted with by a user (e.g., selected within an augmented reality user interface, a user is near or within a virtual subdivision to which a virtual leasehold is assigned) the pop up graphic is displayed. A virtual indicator of a virtual leasehold or other virtual object may also be presented to a user via an augmented reality overlay display of a digital platform. An augmented reality overlay display is a graphical display of a user interface that is overlaid directly onto an image (e.g., still and/or moving image) of a real-world proximity (e.g., a moving image obtained from a camera of a user's device). In one example, an augmented reality overlay display is part of a pop up graphic of a user interface. In another example, an augmented reality overlay display is part of a user interface presented to a user (e.g., a user who is located in or near a virtual subdivision related to a virtual indicator of a virtual leasehold). A virtual indicator of a virtual leasehold or other virtual object may be presented to a user via a virtual assistant (e.g., a chatbot functionality, a voice-activated artificial intelligence functionality). A digital platform, such as an ARSM platform of the current disclosure, may also utilize one or more push notifications related to a virtual indicator of a virtual leasehold, a virtual leasehold, or other virtual object. A push notification is an electronic message (e.g., a mobile device operating system notification, an ARSM platform notification, a text message, an email, and combinations thereof) sent to a user to provide information (e.g., information about a virtual leasehold or related information). A push notification may be generated when a user is located near or within a virtual subdivision (i.e., located physically near or within a real-world subdivision associated with a virtual subdivision) to present to the user relevant information (e.g., information about a product for sale within a virtual leasehold, information about a virtual leasehold, etc.). Further, examples of computing devices that have augmented reality capabilities may be used to create and display to users one or more aspects of an ARSM platform, such as virtual leaseholds, virtual stores, products, etc. For example, devices such as augmented reality headsets can be used to display a user interface of an ARSM platform. Additionally, such devices may implement protocols that include related tools for developing content for an ARSM platform.

A pop up graphic, an augmented reality overlay, and/or a push notification may include any number and type of displayable graphic elements. Examples of displayable graphic elements for inclusion with a pop up graphic include, but are not limited to, a listing of one or more available real-world offerings, a description of one or more real-world offerings, an image of one or more real-world offerings, a graphical display for purchasing a real-world offering, a link to a graphical display for purchasing a real-world offering, a listing of one or more products for sale, a description of a product for sale, an image of a product for sale, a graphical display for purchasing a product and/or service for sale, a link to a graphical display for purchasing a product and/or service for sale, a user interface for providing comment, a logo of a virtual store of a virtual leasehold, a logo of a virtual leasehold, a logo associated with the first user or another user affiliated with the first virtual leasehold, and any combinations thereof. Information to be conveyed to a user of a digital platform (e.g., information related to a virtual leasehold, such as that which could be included as a displayable graphic element) may also be conveyed to a user as an audio output (e.g., using a speaker element of a computing device). For example, an ARSM platform may provide audio information to a user (e.g., in the form of a computer-generated voice) when the user is near or within a virtual subdivision (i.e., located physically near or within a real-world subdivision associated with a virtual subdivision). Additionally, The following examples are nonexclusive examples of implementations/embodiments of an ARSM platform and related methods according to the current disclosure.

1. A method for managing an augmented reality social media platform, the method comprising:
    providing an augmented reality social media platform application to a plurality of devices, the augmented reality social media application for providing one or more augmented reality user interfaces of the augmented reality social media platform;
    receiving from an optical capture element of a first device belonging to a first user, a still and/or moving image of a first real-world proximity surrounding the first device, the first real-world proximity being a part of a real-world defined area, the augmented reality social media platform including a virtual mapping corresponding to the real-world defined area, the virtual mapping including a plurality of leasable virtual subdivisions, each of the leasable virtual subdivisions corresponding to a [similarly dimensioned] real-world subdivision of the real-world defined area;
    receiving from a second user of the augmented reality social media platform a request to lease a first virtual subdivision of the plurality of leasable virtual subdivisions;
    assigning within the augmented reality social media platform a first virtual leasehold corresponding to the first virtual subdivision to the second user;
    displaying via a first display of the one or more augmented reality user interfaces an augmented display of the first real-world proximity; and
    when the first real-world proximity corresponds to the first real-world subdivision, displaying via the first display one or more virtual indicators associated with the first virtual leasehold.
2. A method according to example 1, wherein the one or more virtual indicators includes an indicator selected from the group consisting of an indicator of a virtual e-commerce store, a sign, an image, a border, and any combinations thereof.
3. A method according to any of the previous examples, further comprising limiting the viewability of a first one of the one or more virtual indicators in the first display by a recipient setting selected by the second user in the augmented reality social media platform, a leasehold setting selected by a user authorized by the first leasehold in the augmented reality social media platform, and any combinations thereof.
4. A method according to example 3, wherein the recipient setting and/or leasehold setting each includes a setting selected from the group consisting of a minimum distance from a recipient user to a virtual subdivision, a maximum distance from the recipient user to a virtual subdivision, a demographic characteristic of a virtual leasehold or its assignee, a demographic characteristic of the recipient user, a sales volume of a real-world offering, an availability of a real-world offering, a popularity of a real-world offering, a sales volume of a virtual store of a virtual leasehold, an availability of a product of a virtual store of a virtual leasehold, a popularity of a product of a virtual store of a virtual leasehold, a popularity of a virtual store of a virtual leasehold, a popularity of a virtual leasehold, a popularity of a virtual subdivision, a promotional status of a virtual store of a virtual leasehold, an input of a specific desired product, an input of a favorited product, an input of a favorited virtual store of a virtual leasehold, an input of a favorited virtual leasehold, an input of a favorited virtual subdivision, a time period of existence of a virtual leasehold, a time period of existence of a virtual store of a virtual leasehold, a list of designated customers, and any combinations thereof.
5. A method according to example 4, wherein the demographic characteristic includes a characteristic selected from the group consisting of a minority status, a gender status, a race status, a sexual orientation status, and any combinations thereof.
6. A method according to example 4 or example 5, wherein the availability of a product and/or real-world product includes an availability selected from the group consisting of an availability within a set period of time, a current availability, a scheduled availability, and any combinations thereof.
7. A method according to any of the previous examples, further comprising limiting the viewability of a first one of the one or more virtual indicators based on the location of the second user in the real-world defined area.
8. A method according to example 7, wherein the second user must be located within a real-world subdivision corresponding to a virtual subdivision to which the first virtual leasehold is assigned for the first one of the one or more virtual indicators to be viewable to the second user.
9. A method according to example 7, wherein the second user must be located within a predetermined distance to a real-world subdivision corresponding to a virtual subdivision to which the first virtual leasehold is assigned for the first one of the one or more virtual indicators to be viewable to the second user.
10. A method according to example 7, wherein the limiting the viewability is defined in the augmented reality social media platform by a recipient setting, a leasehold setting, and any combinations thereof.

11. A method according to any of the previous examples, further comprising associating a first real-world offering with the first virtual leasehold and/or the first virtual subdivision.

12. A method according to example 11, wherein the first real-world offering includes an offering selected from the group consisting of a product for sale, a service for sale, a product offering, a service offering, a promotional item, a recruiting item, an event item, and any combinations thereof.

13. A method according to example 11 or example 12, wherein the first real-world offering is in a first offering set of a plurality of real-world offerings.

14. A method according to any of the previous examples, wherein each of the plurality of real-world offerings includes an offering of a first virtual store of the first virtual leasehold.

15. A method according to any of the previous examples, wherein the first real-world offering is represented by the first virtual indicator in the first display.

16. A method according to any of the previous examples, wherein the first virtual indicator is associated with a pop up graphic.

17. A method according to example 16, further comprising:
receiving a selection of the first visual indicator by the second user via a user interface of the augmented reality social media platform; and
providing a display of the pop up graphic.

18. A method according to example 17, wherein the pop up graphic includes an element selected from the group consisting of a listing of one or more available real-world offerings, a description of one or more real-world offerings, an image of one or more real-world offerings, a graphical display for purchasing a real-world offering, a link to a graphical display for purchasing a real-world offering, a listing of one or more products for sale, a description of a product for sale, an image of a product for sale, a graphical display for purchasing a product and/or service for sale, a link to a graphical display for purchasing a product and/or service for sale, a user interface for providing comment, a logo of a virtual store of a virtual leasehold, a logo of a virtual leasehold, a logo associated with the first user or another user affiliated with the first virtual leasehold, and any combinations thereof.

19. A method according to example 17 or example 18, wherein the first visual indicator includes a graphical element selected from the group consisting of a logo of a virtual store of a virtual leasehold, a logo of a virtual leasehold, a logo associated with the first user or another user affiliated with the first virtual leasehold, an image of a real-world offering, an image of a product for sale, an advertisement, and any combinations thereof.

20. A method according to example 17, example 18, or example 19, wherein availability of the pop up graphic is based on the second user being located within the real-world subdivision associated with the virtual subdivision to which the first virtual leasehold is assigned.

21. A method according to example 17, example 18, or example 19, wherein availability of the pop up graphic is based on the second user being located within a predetermined distance to the real-world subdivision associated with the virtual subdivision to which the first virtual leasehold is assigned.

22. A method according to any of the previous examples, wherein the first real-world offering includes an offering of a first virtual store of the first virtual leasehold.

23. A method according to example 22, wherein the augmented reality social media platform includes a first inventory listing for the first virtual store, the first inventory listing including the first real-world offering and, optionally, one or more additional real-world offerings.

24. A method according to example 23, further comprising:
receiving from a third user of the augmented reality social media platform a request to lease a second virtual subdivision of the plurality of leasable virtual subdivisions;
assigning within the augmented reality social media platform a second virtual leasehold corresponding to the second virtual subdivision to the third user;
temporarily allocating one or more shared offerings from the first inventory listing the second virtual leasehold; and
providing a second augmented reality user interface of the augmented reality social media platform to a fourth user of the augmented reality social media platform, the second augmented reality user interface including:
a display of a second proximity of the fourth user, the second proximity including a second real-world subdivision corresponding to the second virtual subdivision, and
a display of a second virtual indicator associated with a first one of the one or more shared offerings.

25. A method according to example 24, wherein the temporarily allocating is based on a first criteria that includes a criteria selected from the group consisting of a setting in the augmented reality social media platform by one or more additional users of the augmented reality social media platform, a setting in the augmented reality social media platform by the first user, a setting in the augmented reality social media platform by the second user, a setting in the augmented reality social media platform by the third user, a setting in the augmented reality social media platform by the fourth user, a recipient setting, a leasehold setting of the first leasehold, a leasehold setting of the second leasehold, an input by the first user, an input by the third user, an offering marketing criteria input to and/or determined by the augmented reality social media platform, a random reassignment schedule, a predetermined reassignment schedule, a current weather condition for the first real-world subdivision, a predicted weather condition for the first real-world subdivision, a current weather condition for the second real-world subdivision, a predicted weather condition for the second real-world subdivision, a time period in a calendar year, a calendar season, and any combinations thereof.

26. A method according to example 25, wherein an offering marketing criteria includes a criteria selected from the group consisting of a demographic characteristic of one or more people that move across or near the second real-world subdivision, a demographic characteristic of one or more people that move across or near the first real-world subdivision, a demographic characteristic of one or more people predicted to move across or near the second real-world subdivision, a demographic characteristic of one or more people predicted to move across or near the first real-world subdivision, a demographic characteristic of one or more people scheduled to move across or near the second real-world subdivision, a demographic characteristic of one or more people scheduled to move across or near the first real-world subdivision, and any combinations thereof.

27. A method according to example 26, wherein a demographic characteristic includes a characteristic selected from the group consisting of a race of an individual, a gender of an individual, a sex of an individual, a sexual orientation of an individual, a course of study of an individual, an enrollment status of an individual in a particular course, an enrollment status of an individual in a real-world organization, a density of people traversing a particular area of a real-world defined area, a density of people traversing a real-world subdivision, and any combinations thereof.

28. A method according to any of the previous examples, wherein the real-world social media platform includes a categorization setting for the first real-world offering and, optionally, one or more additional real-world offerings, the categorization setting including an association of one or more of the criteria of the first criteria with each of the first real-world offering and, optionally, one or more additional real-world offerings.

29. A method according to example 28, further comprising:
   providing a categorization user interface to the first user; and
   receiving an input of the categorization setting from the first user.

30. A method according to any of the previous examples, further comprising:
   temporarily reassigning within the augmented reality social media platform the first leasehold to a second virtual subdivision of the plurality of leasable virtual subdivisions; and
   providing a second augmented reality user interface of the augmented reality social media platform to a third user of the augmented reality social media platform, the second augmented reality user interface including:
      a display of a second proximity of the third user, the second proximity including a second real-world subdivision corresponding to the second virtual subdivision, and
      a display of a second virtual indicator associated with a real-world offering of the first leasehold.

31. A method according to example 30, wherein the temporarily reassigning includes:
   temporarily unassigning the first virtual leasehold from the first virtual subdivision.

32. A method according to example 30, wherein the temporarily reassigning includes:
   continuing to have the first virtual leasehold assigned to the first virtual subdivision in addition to the second virtual subdivision.

33. A method according to example 30, example 31, or example 32, wherein the temporarily reassigning is based on a reassignment criteria that includes a criteria selected from the group consisting of a setting in the augmented reality social media platform by one or more additional users of the augmented reality social media platform, a setting in the augmented reality social media platform by the first user, a setting in the augmented reality social media platform by the second user, a setting in the augmented reality social media platform by the third user, a recipient setting, a leasehold setting of the first leasehold, an input by the first user, an input by the third user, an offering marketing criteria input to and/or determined by the augmented reality social media platform, a random reassignment schedule, a predetermined reassignment schedule, a current weather condition for the first real-world subdivision, a predicted weather condition for the first real-world subdivision, a current weather condition for the second real-world subdivision, a predicted weather condition for the second real-world subdivision, a time period in a calendar year, a calendar season, and any combinations thereof.

34. A method according to example 33, wherein an offering marketing criteria includes a criteria selected from the group consisting of a demographic characteristic of one or more people that move across or near the second real-world subdivision, a demographic characteristic of one or more people that move across or near the first real-world subdivision, a demographic characteristic of one or more people predicted to move across or near the second real-world subdivision, a demographic characteristic of one or more people predicted to move across or near the first real-world subdivision, a demographic characteristic of one or more people scheduled to move across or near the second real-world subdivision, a demographic characteristic of one or more people scheduled to move across or near the first real-world subdivision, and any combinations thereof.

35. A method according to example 34, wherein a demographic characteristic includes a characteristic selected from the group consisting of a race of an individual, a gender of an individual, a sex of an individual, a sexual orientation of an individual, a course of study of an individual, an enrollment status of an individual in a particular course, an enrollment status of an individual in a real-world organization, a density of people traversing a particular area of a real-world defined area, a density of people traversing a real-world subdivision, and any combinations thereof.

36. A method according to any of examples 33 to 35, wherein the real-world social media platform includes a categorization setting for the first real-world offering and, optionally, one or more additional real-world offerings, the categorization setting including an association of one or more of the criteria of the reassignment criteria with each of the first real-world offering and, optionally, one or more additional real-world offerings.

37. A method according to any of the previous examples, further comprising:
   providing a categorization user interface to the first user; and
   receiving an input of the categorization setting from the first user.

38. A method according to any of the previous examples, further comprising:
   receiving from a fourth user of the augmented reality social media platform a request to lease a third virtual subdivision of the plurality of leasable virtual subdivisions;
   assigning within the augmented reality social media platform a second virtual leasehold corresponding to the third virtual subdivision to the third user;

temporarily reassigning within the augmented reality social media platform the second leasehold to the first virtual subdivision of the plurality of leasable virtual subdivisions; and providing a third augmented reality user interface of the augmented reality social media platform to a fifth user of the augmented reality social media platform, the third augmented reality user interface including:

a display of the first proximity, and a display of a third virtual indicator associated with a real-world offering of the second leasehold.

39. A method according to example 1, wherein the real-world defined area is controlled by a first real-world organization and the method further comprises:

receiving a first identifier of the real-world identity of the second user;

correlating the first identifier with a current database of people currently affiliated with the first real-world organization;

if the first identifier positively correlates with a person in the current database, assigning the first virtual leasehold with a time limitation corresponding to the second user's affiliation with the first real-world organization; and if the first identifier does not correlate with a person in the current database, providing a second display of the one or more augmented reality user interfaces to the second user with a denial of the first virtual leasehold.

40. A method according to example 39, wherein the first real-world organization includes an organization selected from the group consisting of an educational institution, a sporting organization, a retail organization, a real estate development organization, a shopping mall, and any combinations thereof.

41. A method according to example 40, wherein the educational institution includes an educational entity selected from the group consisting of a university, a college, an academy, a public school, a private school, an elementary school, a secondary school, a vocational school, and any combinations thereof.

42. A method according to example 40, wherein the sporting organization includes a sporting entity selected from the group consisting of a sports franchise, an amateur sporting entity, a professional sporting entity, a club sporting entity, a sports facility entity, a sporting fan group, and any combination thereof.

43. A method according to any of examples 39 to 42, wherein being controlled by a first real-world organization includes a controlling factor selected from the group consisting of owning an interest in the real-world defined area, leasing an interest in the real-world defined area, having license to the real-world defined area, having an ability to physically limit access to people to the real-world defined area, having an ability to legally limit access to people to the real-world defined area, and any combinations thereof.

44. A method according to any of examples 39 to 43, wherein the first real-world organization is an educational institution and the real-world defined area includes a campus of the educational institution.

45. A method according to example 44, wherein the time limitation is bounded by the enrollment status of the second user in the educational institution.

46. A method according to example 1, wherein the first virtual leasehold includes a right for the second user to establish a virtual store in the first virtual subdivision or any other virtual subdivision to which the first virtual leasehold is associated.

47. A method according to example 46, wherein the one or more virtual indicators includes a visual indicator selected from the group of visual indicators including a product for sale, a sign, and any combinations thereof.

48. A method according to example 46, wherein the one or more virtual indicators includes a first visual indicator of a first product for sale.

49. A method according to example 48, wherein the first product for sale is included in a merchandise listing of the virtual store, the augmented reality social media platform having access to the merchandise listing, the merchandise listing including a plurality of products for sale.

50. A method according to example 49, wherein the first visual indicator is part of a set of visual indicators, each of the visual indicators representing one or more select products from the merchandise listing, the one or more virtual indicators including the set of visual indicators.

51. A method according to any of examples 46 to 50, wherein the one or more virtual indicators includes a first visual indicator associated with a pop up graphic.

52. A method according to example 51, further comprising:

receiving a selection of the first visual indicator by the second user via a user interface of the augmented reality social media platform; and providing a display of a pop up graphic.

53. A method according to example 52, wherein the pop up graphic includes a listing of one or more products for sale by a first virtual store of the first virtual leasehold.

54. A method according to example 52 or example 53, wherein the pop up graphic includes an element selected from the group consisting of a listing of one or more products for sale, a description of a product for sale, an image of a product for sale, a graphical display for purchasing a product or service? for sale, a link to a graphical display for purchasing a product for sale, an user interface for providing comment, a logo of a virtual store of a virtual leasehold, and any combinations thereof.

55. A method according to any of examples 52 to 54, wherein the first visual indicator includes a graphical element selected from the group consisting of a logo of a virtual store of a virtual leasehold, an image of a product for sale, an advertisement, and any combinations thereof.

56. A method according to any of examples 52 to 55, wherein availability of the pop up graphic is based on the second user being located within the real-world subdivision associated with the virtual subdivision to which the first virtual leasehold is assigned.

57. A method according to any of examples 52 to 55, wherein availability of the pop up graphic is based on the second user being located within a predetermined distance to the real-world subdivision associated with the virtual subdivision to which the first virtual leasehold is assigned.

58. A method according to any of the previous examples, further comprising:

monitoring a real-world traffic indicator, wherein the real-world traffic indicator corresponds to an actual and/or predicted characteristic of people traversing the real-world defined area; and reassigning the first virtual leasehold, based on the real-world traffic indicator, from the first virtual subdivision to a second virtual subdivision of the plurality of leasable virtual subdivisions.

59. A method according to example 58, wherein the actual and/or predicted characteristic of people traversing the real-world defined area is based on people including at least one person selected from the group consisting of a user of the augmented reality social media platform, a non-user of the augmented reality social media platform, a person who is affiliated with an organization that controls the real-world defined area, a person who is unaffiliated with an organization that controls the real-world defined area, and any combinations thereof.

60. A method according to example 58 or example 59, wherein the people include only people who are members of the same group and the same group is a group of users of the augmented reality social media platform, a group of non-user of the augmented reality social media platform, a group of people who are affiliated with an organization that controls the real-world defined area, or a group of people who are not unaffiliated with an organization that controls the real-world defined area.

61. A method according to any of examples 58 to 60, wherein the real-world defined area is controlled by a first real-world organization and the method further comprises:
receiving a first identifier of the real-world identity of the second user;
correlating the first identifier with a current database of people currently affiliated with the first real-world organization;
if the first identifier positively correlates with a person in the current database, assigning the first virtual leasehold with a time limitation corresponding to the second user's affiliation with the first real-world organization; and
if the first identifier does not correlate with a person in the current database, providing a second display of the one or more augmented reality user interfaces to the second user with a denial of the first virtual leasehold.

62. A method according to example 61, wherein the first real-world organization includes an organization selected from the group consisting of an educational institution, a sporting organization, a retail organization, a real estate development organization, a shopping mall, and any combinations thereof.

63. A method according to example 62, wherein the educational institution includes an educational entity selected from the group consisting of a university, a college, an academy, a public school, a private school, an elementary school, a secondary school, a vocational school, and any combinations thereof.

64. A method according to example 62, wherein the sporting organization includes a sporting entity selected from the group consisting of a sports franchise, an amateur sporting entity, a professional sporting entity, a club sporting entity, a sports facility entity, a sporting fan group, and any combination thereof.

65. A method according to any of examples 61 to 64, wherein being controlled by a first real-world organization includes a controlling factor selected from the group consisting of owning an interest in the real-world defined area, leasing an interest in the real-world defined area, having license to the real-world defined area, having an ability to physically limit access to people to the real-world defined area, having an ability to legally limit access to people to the real-world defined area, and any combinations thereof.

66. A method according to example 61, wherein the first real-world organization is an educational institution and the real-world defined area includes a campus of the educational institution.

67. A method according to example 66, wherein the time limitation is bounded by the enrollment status of the second user in the educational institution.

68. A processor-readable physical storage medium including processor-executable instructions for performing any one of the above methods in examples 1 to 67, the instructions including one or more sets of instructions, each set of instructions for performing an aspect of the corresponding method.

69. An augmented reality social media platform configured to perform any one of the above methods in examples 1 to 67.

70. An augmented reality social media platform configured to perform any one of the above methods in examples 1 to 67, wherein the platform includes programming and hardware infrastructure for implementing each of the steps of said method.

71. A platform according to example 70, wherein the platform includes one or more user interfaces for receiving and/or displaying information related to one or more of the steps of said method.

72. An augmented reality social media platform including:
a virtual mapping corresponding to a real-world defined area, the virtual mapping including a plurality of leasable virtual subdivisions, each of the leasable virtual subdivisions corresponding to a real-world subdivision of the real-world defined area;
a database of information that includes the assignment of a plurality of virtual leaseholds wherein each virtual leasehold corresponds to a virtual subdivision of the plurality of leasable virtual subdivisions, a first virtual leasehold of the plurality of virtual leaseholds corresponding to a first virtual subdivision of the plurality of leasable virtual subdivisions being assigned to a first user of the augmented reality social media platform, the first virtual subdivision corresponding to a first real-world subdivision of the real-world defined area;
a connection to an optical capture element of a first device belonging to a second user of the augmented reality social media platform for capturing one or more still and/or moving images of the real-world proximity surrounding the first device, the real-world proximity being a part of and/or including the real-world defined area,
a first augmented reality user interface including a first still and/or moving image of the real-world proximity and [optional: ", when the real-world proximity depicted in the first still and/or moving image includes the first real-world subdivision or another real-world subdivision corresponding to a virtual subdivision of the plurality of subdivisions to which the first leasehold is assigned,"] including one or more indicators associated with the first virtual leasehold. [alternate: including one or more indicators associated with the first virtual leasehold, wherein the one or more indicators are graphically overlaid on a portion of the first still and/or moving image corresponding to a real-world subdivision of the real-world defined area to which the first leasehold is "ASSIGNED" [via a virtual subdivision].]

73. A platform according to example 72, wherein the real-world defined area is controlled by a first real-world organization and further comprising:
   a second connection to a database including information relating to people currently affiliated with the first real-world organization;
   a module for:
      receiving and correlating a first identifier of the real-world identity of each user of the augmented reality social media platform that requests assignment of a leasehold of the plurality of leaseholds with the information relating to people currently affiliated with the first real-world organization, and
      restricting the assignment of each of the plurality of leaseholds based on the correlating.

74. A platform according to example 72 or 69, further comprising:
   a second augmented reality user interface displayable at a different time from the first augmented reality user interface, the second augmented reality user interface including a second still and/or moving image of the real-world proximity including one or more indicators associated with the first virtual leasehold. [alternate: including one or more indicators associated with the first virtual leasehold, wherein the one or more indicators are graphically overlaid on a portion of the first still and/or moving image corresponding to a second real-world subdivision of the real-world defined area, the first leasehold being temporarily assigned to a second virtual subdivision corresponding to the second real-world subdivision based on real-world traffic indicator corresponding to an actual and/or predicted characteristic of people traversing the real-world defined area.

It is to be noted that any one or more of the aspects, ideas, concepts, implementations, examples, and embodiments described herein may be conveniently implemented using one or more machines (referred to herein as a computing device, e.g., one or more user computing devices, one or more server devices) programmed according to the teachings of the present disclosure, as will be apparent to those of ordinary skill in the computer art. Appropriate software coding can readily be prepared by skilled programmers based on the teachings of the present disclosure, as will be apparent to those of ordinary skill in the software and related platform arts. Aspects, ideas, concepts, implementations, examples, and embodiments discussed herein may employ software and/or software modules and may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein, except that a machine-readable storage medium is not a medium that simply transports data from one point to another without a time period (however short or long) of storage in a hardware material (e.g., a signal is not a machine-readable storage medium). Examples of a machine-readable storage medium include, but are not limited to, a solid state memory, a flash memory, a random access memory (e.g., a static RAM "SRAM", a dynamic RAM "DRAM", etc.), a magnetic memory (e.g., a hard disk, a tape, a floppy disk, etc.), an optical memory (e.g., a compact disc (CD), a digital video disc (DVD), a Blu-ray disc (BD); a readable, writeable, and/or re-writable disc, etc.), a read only memory (ROM), a programmable read-only memory (PROM), a field programmable read-only memory (FPROM), a one-time programmable non-volatile memory (OTP NVM), an erasable programmable read-only memory (EPROM), an electrically erasable programmable read-only memory (EEPROM), and any combinations thereof, and any combinations thereof. Such examples are hardware storage media. If used herein, the term "non-transitory" in relation to a medium refers to a hardware storage medium that stores machine-readable instructions for a period of time, even if that time period is extremely small or temporary, and even if the storage of such instructions is fragile or reliant upon the provision of a continued electrical source. The examples of a machine-readable storage medium listed above in this paragraph are considered non-transitory. For example, machine executable instructions for a ARSM platform (or a portion of a ARSM platform) and/or related aspects and/or related methods and/or data may, in addition to one or more other machine-readable storage media, be stored in a RAM memory of a computing device (e.g., in RAM memory of a user computing device while a user accesses the digital platform, in RAM memory of a cloud computing device while the platform is being accessed and/or operating, in combination of memory locations in a distributed network environment, etc.) for short periods of time and/or only while the computing device is powered on. In such a case, the RAM memory may be referred to, for example, as a non-transitory medium, A machine-readable medium, as used herein, is intended to include a single medium as well as a collection of physically separate media (localized and/or dispersed physically as in a distributed digital platform having a portion of machine-executable instructions on one or more server computers and/or one or more user devices), such as, for example, a collection of compact disks, one or more hard disk drives in combination with a computer memory, an array of RAM modules, etc. When used herein, the term "memory" includes examples that would include one or more machine-readable storage media. As used herein, the term "machine-readable storage medium" does not include a signal, carrier wave, or similar non-hardware based forms of encoding data, by themselves such forms being transitory in nature.

Such software may also include information (e.g., data, instructions, etc.) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein. Such examples are not to be considered a machine-readable storage medium as that term is used herein. However, it is contemplated that such examples may be used in implementing one or more aspects, ideas, concepts, implementations, examples, and embodiments of the current disclosure if appropriate.

Machine-executable instructions may be disbursed across a plurality of computing devices (e.g., one or more user devices and one or more server computers) and connected via one or more networks, such as in the example shown in FIG. 1 above.

A computing device is any machine that is capable of executing machine-executable instructions to perform one or more tasks. Examples of a computing device include, but are not limited to, a tablet, an electronic book reading device, a workstation computer, a terminal computer, a server computer, a laptop computer, a mobile telephone (e.g., a smartphone), a portable and/or handheld computing device, a wearable computing device (e.g., a smart watch, a smart wearable eyeglass, a smart wearable headset, an augmented reality wearable device, etc.), a web appliance, a network router, a network switch, a network bridge, one or more application specific integrated circuits, an application specific programmable logic device, an application specific field programmable gate array, any machine capable of executing a sequence of instructions that specify an action to be taken by that machine (e.g., an optical, chemical, biological, quantum and/or nanoengineered system and/or mechanism), and any combinations thereof. In one example, a computing device may include and/or be included in, a kiosk. In another example, a computing device is a smartphone. A computing device may include and/or be programed with specific machine-executable instructions (e.g., to perform one or more of the features, aspects, examples, or implementation of the current disclosure; to operate the computing device generally) and include required circuitry and components such that the combination of the circuitry/components and the instructions allow it to perform as a specialized machine in one or more of the implementations disclosed in the current disclosure. For example, a computing device may utilize any of a variety of known or yet to be developed operating systems, firmware, and/or other software for its operation. Examples of an operating system include, but are not limited to, Apple's iOS, Amazon's Fire OS, Google's Android operating system, Microsoft's Windows Phone operating system, Microsoft's Windows operating system, Apple's Operating System, a Linux-kernel based operating system, and any combinations thereof.

A network is a way for connecting two or more computing devices to each other for communicating information (e.g., data, machine-executable instructions, image files, video files, electronic messages, etc.). Examples of a network include, but are not limited to, a wide area network (e.g., the Internet, an enterprise network), a local area network (e.g., a network associated with an office, a building, a campus or other relatively small geographic space), a short distance network connection, a telephone network, a data network associated with a telephone/voice provider (e.g., a mobile communications provider data and/or voice network), another data network, a direct connection between two computing devices (e.g., a peer-to-peer connection), a proprietary service-provider network (e.g., a cable provider network), a wired connection, a wireless connection (e.g., a Bluetooth connection, a Wireless Fidelity (Wi-Fi) connection (such as an IEEE 802.11 connection), a Worldwide Interoperability for Microwave Access connection (WiMAX) (such as an IEEE 802.16 connection), a Global System for Mobile Communications connection (GSM), a Personal Communications Service (PCS) connection, a Code Division Multiplex Access connection (CDMA), and any combinations thereof. A network may employ one or more wired, one or more wireless, and/or one or more other modes of communication. A network may include any number of network segment types and/or network segments. In one example, a network connection between two computing devices may include a Wi-Fi connection between a sending computing device and a local router, an Internet Service Provider (ISP) owned network connecting the local router to the Internet, an Internet network (e.g., itself potentially having multiple network segments) connection connecting to one or more server computing devices and also to a wireless network (e.g., mobile phone) provider of a recipient computing device, and a telephone-service-provider network connecting the Internet to the recipient computing device.

Figure 5:
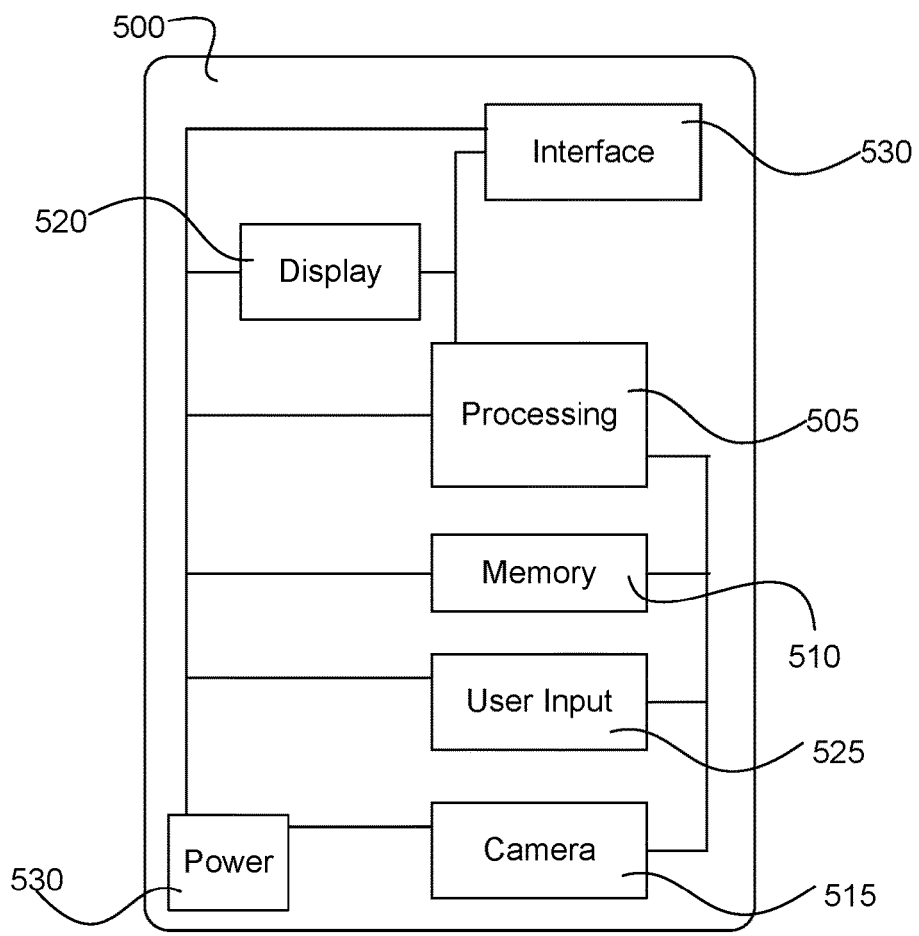
FIG. 5 illustrates one example diagrammatic representation of one implementation of a computing device.

FIG. 5 illustrates one example diagrammatic representation of one implementation of a computing device 500. Computing device 500 includes a processing element 505, a memory 510, a display generator 515, a user input 520, a networking element 525, and a power supply 530. Processing element 505 includes circuitry and/or machine-executable instructions (e.g., in the form of firmware stored within a memory element included with and/or associated with processing element 505) for executing instructions for completing one or more tasks (e.g., tasks associated with one or more of the implementations, methodologies, features, aspects, and/or examples described herein). Examples of a processing element include, but are not limited to, a microprocessor, a microcontroller, one or more circuit elements capable of executing a machine-executable instruction, and any combinations thereof.

Memory 510 may be any device capable of storing data (e.g., user data as part of or affiliated with a ARSM platform or other digital platform, information input by a user, information stored by a user, information received at computing device 500 as part of a ARSM or other digital platform, etc.), machine-executable instructions, an operating system, an "app" as part of a ARSM or other digital platform, a basic input/output system (BIOS) including basic routines that help to transfer information between components of a computing device, and/or other information related to one or more of the implementations, methodologies, features, aspects, and/or examples described herein. A memory, such as memory 510, may include one or more machine-readable storage medium.

A memory may be removable from device 500. A memory, such as memory 510, may include and/or be associated with a memory access device. For example, a memory may include a medium for storage and an access device including one or more circuitry and/or other components for reading from and/or writing to the medium. In one such example, a computing device may include a port (e.g., a Universal Serial Bus (USB) port) for accepting a memory component (e.g., a removable flash USB memory device).

Device 500 includes camera 515 connected to processing element 505 (and other components). Examples of a camera include, but are not limited to, a still image camera, a video camera, and any combinations thereof.

Display component 520 is connected to processing element 505 for providing a display according to any one or more of the implementations, examples, aspects, etc. of the current disclosure (e.g., providing an interface, displaying separated display screens for each of a plurality of portions of an image, etc.). A display component 515 may include a display element, a driver circuitry, display adapter, a display generator, machine-executable instructions stored in a memory for execution by a processing element for displaying still and/or moving images on a screen, and/or other circuitry for generating one or more displayable images for display via a display element. Example display elements are discussed below. In one example, a display element is integrated with device 500 (e.g., a built-in LCD touch screen). In another example, a display element is associated with device 500 in a different fashion (e.g., an external LCD panel connected via a display adapter of display component 515, a wearable headset having one or more display panels wirelessly connected to device 500).

User input 525 is configured to allow a user to input one or more commands, instructions, and/or other information to computing device 500. For example, user input 525 is connected to processing element 505 (and optionally to other components directly or indirectly via processing element 505) to allow a user to interface with computing device 500 (e.g., to actuate camera 515, to input instructions, information, or other inputs for performing (or as otherwise needed for) one or more aspects and/or methodologies of the present disclosure). Examples of a user input include, but are not limited to, a keyboard, a keypad, a screen displayable input (e.g., a screen displayable keyboard), a button, a toggle, a microphone (e.g., for receiving audio instructions), a pointing device, a joystick, a gamepad, a cursor control device (e.g., a mouse), a touchpad, an optical scanner, a video/image capture device (e.g., a camera), a touch screen of a display element/component, a pen device (e.g., a pen that interacts with a touch screen and/or a touchpad), a motion and/or image detecting device (e.g., a three dimensional motion detector) for receiving user gesture commands, and any combination thereof. It is noted that camera 515 and/or a touch screen of a display element of display component 520 may function also as an input element. It is also contemplated that one or more commands, data, and/or other information may be input to a computing device via a data transfer over a network and/or via a memory device (e.g., a removable memory device). A user input, such as user input 525, may be connected to computing device 500 via an external connector (e.g., an interface port).

External interface element 530 includes circuitry and/or machine-executable instructions (e.g., in the form of firmware stored within a memory element included with and/or associated with interface element 530) for communicating with one or more additional computing devices and/or connecting an external device to computing device 500. An external interface element, such as element 530, may include one or more external ports. In another example, an external interface element includes an antenna element for assisting with wireless communication. Examples of an external interface element include, but are not limited to, a network adapter, a Small Computer System Interface (SCSI), an advanced technology attachment interface (ATA), a serial ATA interface (SATA), an Industry Standard Architecture (ISA) interface, an extended ISA interface, a Peripheral Component Interface (PCI), a Universal Serial Bus (USB), an IEEE 1394 interface (FIREWIRE), and any combinations thereof. A network adapter includes circuitry and/or machine-executable instructions configured to connect a computing device, such as computing device 500, to a network.

Power supply 530 is shown connected to other components of computing device 505 to provide power for operation of each component. Examples of a power supply include, but are not limited to, an internal power supply, an external power supply, a battery, a fuel cell, a connection to an alternating current power supply (e.g., a wall outlet, a power adapter, etc.), a connection to a direct current power supply (e.g., a wall outlet, a power adapter, etc.), and any combinations thereof.

Components of device 500 (processing element 505, memory 510, camera 515, display component 520, user input 525, interface element 530, power supply 535) are shown as single components. A computing device may include multiple components of the same type. A function of any one component may be performed by any number of the same components and/or in conjunction with another component. For example, it is contemplated that the functionality of any two or more of processing element 505, memory 510, camera 515, display component 520, user input 525, interface element 530, power supply 535, and another component of a computing device may be combined in an integrated circuit. In one such example, a processor (e.g., processing element 505) may include a memory for storing one or more machine executable instructions for performing one or more aspects and/or methodologies of the present disclosure. Functionality of any one or more components may also be distributed across multiple computing devices. Such distribution may be in different geographic locations (e.g., connected via a network). Components of device 500 are shown as internal components to device 500. A component of a computing device, such as device 500, may be associated with the computing device in a way other than by being internally connected.

Components of computing device 500 are shown connected to other components. Examples of ways to connect components of a computing device include, but are not limited to, a bus, a component connection interface, another type of connection, and/or any combinations thereof. Examples of a bus and/or component connection interface include, but are not limited to, a memory bus, a memory controller, a peripheral bus, a local bus, a parallel bus, a serial bus, a SCSI interface, an ATA interface, an SATA interface, an ISA interface, a PCI interface, a USB interface, a FIREWIRE interface, and any combinations thereof. Various bus architectures are known. Select connections and components in device 500 are shown. For clarity, other connections and various other well-known components (e.g., an audio speaker, a printer, etc.) have been omitted and may be included in a computing device. Additionally, a computing device may omit in certain implementations one or more of the shown components.

Figure 6:
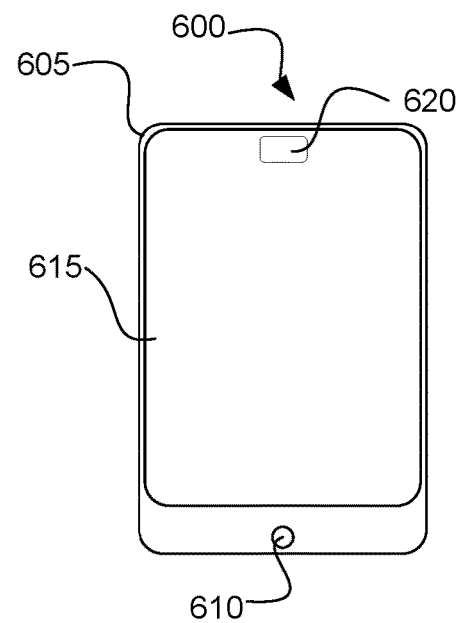
FIG. 6 illustrates one example of a portable handheld computing device in the form of a smartphone.

As discussed above, one example of a computing device that may be utilized in one or more of the implementations of a method of the present disclosure is a handheld computing device. FIG. 6 illustrates one example of a portable handheld computing device in the form of a smartphone 600. Smartphone 600 includes a body 605, a microphone input element 610, a display element 615, and a speaker output element 620. Display element 615 may be a touch screen to provide a user with additional input interface capabilities. A computing device, such as smartphone 600, may be used in a variety of ways with respect to any of the implementations, embodiments, and/or methodologies described herein. Exemplary ways to utilize smartphone 600 (or another computing device) include, but are not limited to, receiving an instruction (and/or other input, request, etc.) from a user of a computing device, presenting information or other displayable aspects to a user of a digital platform, and any combinations thereof.

Examples of a display element or component include, but are not limited to, a computer monitor, a liquid crystal display (LCD) display screen, a light emitting diode (LED) display screen, a touch display, a cathode ray tube (CRT), a plasma display, a projection device, a holographic image projection device, and any combinations thereof. A display element may include, be connected with, and/or associated with adjunct elements to assist with the display of still and/or moving images. Examples of an adjunct display elements include, but are not limited to, a display generator (e.g., image/image display circuitry), a display adapter, a display driver, machine-executable instructions stored in a memory for execution by a processing element for displaying still and/or moving images on a screen, and any combinations thereof. Such display devices may be included in any of a variety of known forms including, but not limited to, a display element directly connected to a computing device, a display element connected to a computing device via a wire, a display element wirelessly connected, a display element of a headset device, a display element of a stand-alone device, a display element of an eyeglass device, and any combinations thereof.

In one exemplary aspect, a ARSM platform of the current disclosure includes one or more user interfaces that display images, text, and/or graphic elements to a user (e.g., via a display device associated with a user computing device) and allow a user to interact with a ARSM platform (e.g., via one or more user inputs, such as a mouse, touch screen, etc.). For example, via one or more user interfaces, one or more users can access and interact with exemplary implementations of a ARSM platform and, optionally, interact with each other, interact with a virtual leasehold (e.g., shop and/or buy one or more products), setup a virtual leasehold (e.g., configure a virtual store), enter one or more settings, make other interactions, and any combinations thereof.

A user may interact with a user interface via actuation of user interface elements and inputting information. Example input elements for interacting with a user include, but are not limited to, a radio button, a toggle switch, a pull-down menu, a text entry field, a hover button, a drag and drop functionality, a pop-up menu, a right-click menu, a screen displayed keyboard (e.g., a touchscreen keyboard), and any combinations thereof. Examples of interactions with a user interface include, but are not limited to, providing instructions to a digital platform, inputting information to a digital platform (e.g., information required for a user setting, information for a request, etc.), actuating a user interface element, making a selection (e.g., selecting an option in a menu), make an association of one object with another object, inputting text, typing (e.g., on an on-screen keyboard), hovering, gesturing (e.g., moving a hand or other object for detection by a motion detection device of a computing device), swiping in a direction of a user interface, and any combinations thereof. Other example user input element actuations and combinations of actuations will be understood and applicable depending on the particular computing device, interface, display element, etc.

A user interface may be presented to a user as multiple screen displays presented at different times to a user (e.g., in succession). Additionally, multiple user interfaces may be provided as a combined interface (e.g., such that the combined interface displays combined functionality at the same time to a user). Examples of ways to combine functionality in a screen display interface include, but are not limited to, using different portions of a screen display of an interface for different functionality, superimposing a user actuatable element of a screen display over another element of a screen display (e.g., superimposing user actuatable elements for performing one or more functions over an interaction object or subcomponent thereof), and any combinations thereof. Examples of a user actuatable element include but are not limited to, a graphical element, a textual element, an image element, an element selectable using a pointer device, an element selectable using a touch screen actuation, and any combinations thereof.

A user of a digital platform, such as a ARSM platform, may utilize one or more user interfaces of the platform to input, make a selection, provide, be presented to, otherwise provide information and/or otherwise interact with the platform (and/or other users) as required by any one or more of the details, concepts, aspects, features, characteristics, examples, and/or alternatives of an implementation, embodiment, method, and/or other methodology disclosed herein.

A computer device, such as computing device 500, 600, 700 (see below), may include a haptic response generator (e.g., a vibrating functionality). When a user interacts with an element of a user interface (e.g., a virtual indicator of a virtual leasehold, another virtual object, another user actuatable element, etc.) a digital platform, such as an ARSM platform as described herein, may be configured to provide a haptic response to a user (e.g., via a haptic response generator of the user's computing device). In one example, an ARSM platform includes a user interface haptic response that vibrates a user's computing device when the user is near or within a particular virtual leasehold. In another example, an ARSM platform includes a user interface haptic response that vibrates a user's computing device when the user selects an item in a user interface (e.g., selects a virtual indicator of a virtual leasehold).

An ARSM platform my need to communicate with one or more computing devices or software applications outside of the ARSM platform, such as when an ARSM platform needs to communicate with a database of an organization to determine membership of an individual, communicate with a third-party resource (e.g., a sensor network, weather agency, or other information provider), and/or communicate with software operating on a user's device. Such communication may be achieved by known mechanisms or future developed mechanisms. One such mechanism is an Application Programming Interface ("API"). In one example, an ARSM platform can communicate via an API of a phone's software to obtain information (e.g., GPS information) for use in the ARSM platform. In another example, an ARSM platform can communicate via an API of a database to obtain information for use in the ARSM platform.

Figure 7:
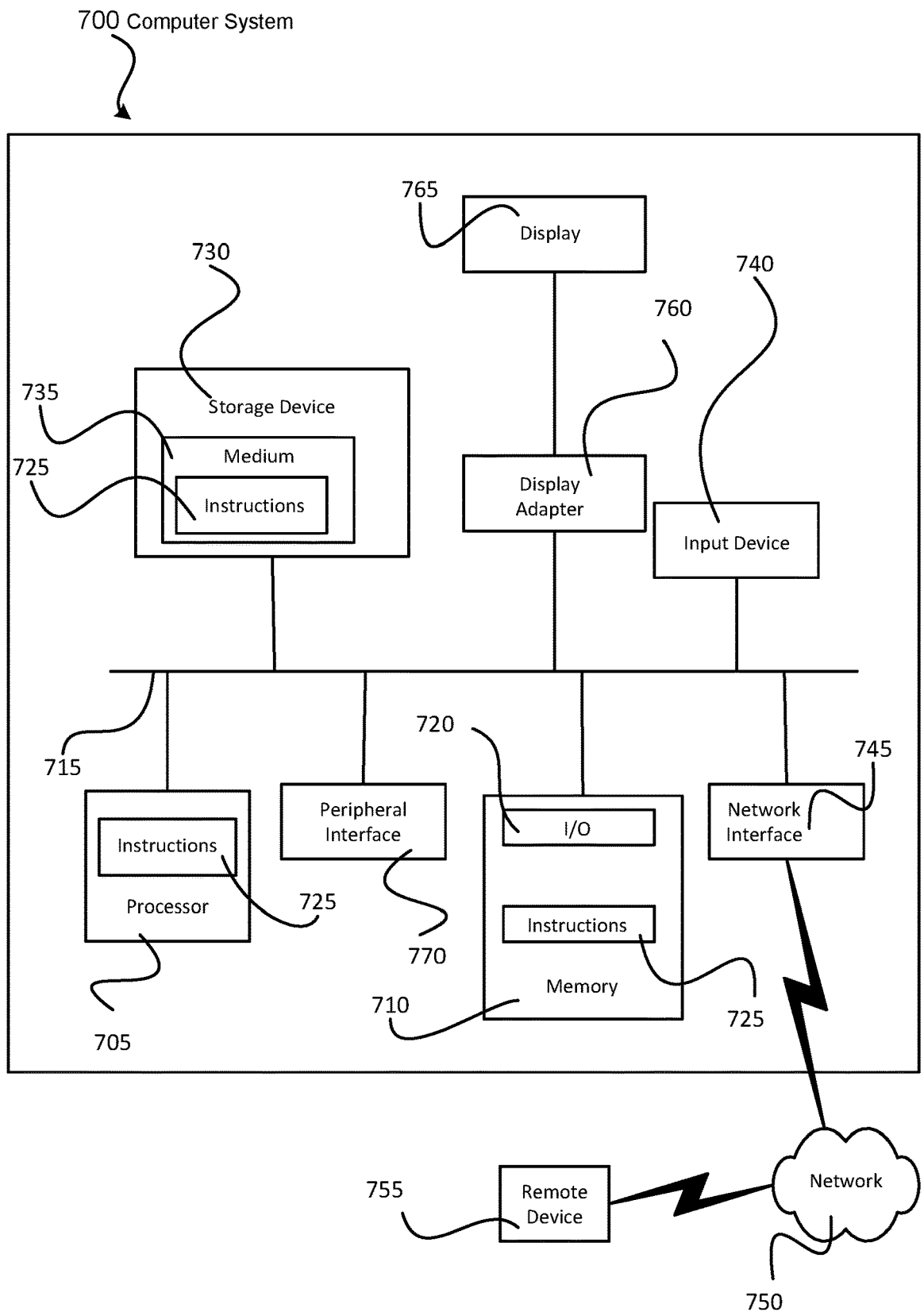
FIG. 7 illustrates a diagrammatic representation of one embodiment of a computing device in the exemplary form of a computer system within which a set of instructions for causing the device to perform any one or more of the aspects and/or methodologies of the present disclosure may be executed.

FIG. 7 shows a diagrammatic representation of one embodiment of a computing device in the exemplary form of a computer system 700 within which a set of instructions for causing the device to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Any such device or combination of devices constitutes a specially programmed machine for the functionalities of the current disclosure (e.g., an ARSM platform or related methods disclosed herein). Computer system 700 includes a processor 705 and a memory 710 that communicate with each other, and with other components, via a bus 715. Bus 715 may include any of several types of bus structures including, but not limited to, a memory bus, a memory controller, a peripheral bus, a local bus, and any combinations thereof, using any of a variety of bus architectures.

Memory 710 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 720 (BIOS), including basic routines that help to transfer information between elements within computer system 700, such as during start-up, may be stored in memory 710. Memory 710 may also include (e.g., stored on one or more machine-readable media) instructions (e.g., software) 725 embodying any one or more of the aspects and/or methodologies of the present disclosure. In another example, memory 710 may further include any number of program modules including, but not limited to, an operating system, one or more application programs, other program modules, program data, and any combinations thereof.

Computer system 700 may also include a storage device 730. Examples of a storage device (e.g., storage device 730) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 730 may be connected to bus 715 by an appropriate interface (not shown). Example interfaces include, but are not limited to, SCSI, advanced technology attachment (ATA), serial ATA, universal serial bus (USB), IEEE 794 (FIREWIRE), and any combinations thereof. In one example, storage device 730 (or one or more components thereof) may be remotely interfaced with computer system 700 (e.g., via an external port connector (not shown)). Particularly, storage device 730 and an associated machine-readable medium 735 may provide nonvolatile and/or volatile storage of machine-readable instructions, data structures, program modules, and/or other data for computer system 700. In one example, software 725 may reside, completely or partially, within machine-readable medium 735. In another example, software 725 may reside, completely or partially, within processor 705.

Computer system 700 may also include an input device 740 (e.g., a user input). In one example, a user of computer system 700 may enter commands and/or other information into computer system 700 via input device 740. Input device 740 may be interfaced to bus 715 via any of a variety of interfaces (not shown) including, but not limited to, a serial interface, a parallel interface, a game port, a USB interface, a FIREWIRE interface, a direct interface to bus 715, and any combinations thereof. Input device may include a touch screen interface that may be a part of or separate from display 765, discussed further below.

A user may also input commands and/or other information to computer system 700 via storage device 730 (e.g., a removable disk drive, a flash drive, etc.) and/or a network interface device 745. A network interface device, such as network interface device 745 may be utilized for connecting computer system 700 to one or more of a variety of networks, such as network 750, and one or more remote devices 755 connected thereto. Examples of a network interface device include, but are not limited to, a network interface card (e.g., a mobile network interface card, a LAN card), a modem, a wireless transmitter, a wireless receiver, a wireless transceiver, and any combination thereof. Information (e.g., data, software 725, etc.) may be communicated to and/or from computer system 700 via network interface device 745.

Computer system 700 may further include a video display adapter 760 for communicating a displayable image to a display device, such as display device 765 (e.g., for providing user access to one or more user interfaces). In addition to a display device, a computer system 700 may include one or more other peripheral output devices including, but not limited to, an audio speaker, a printer, and any combinations thereof. Such peripheral output devices may be connected to bus 715 via a external interface element 770.

A computer system, such as system 500, 600, 700, may include a positioning device (not shown) to determine the location of the computer system (and, optionally, a user of the computer system). Example positioning devices, such as a GPS (Global Positioning System) device, a GLONASS positioning system device, a Galileo positioning system device, another satellite based positioning device, a radio frequency based positioning system device, a Wi-Fi based positioning system device, a mobile network positioning system device, a local positioning system device, and any combinations thereof. A computer system, such as system 500, 600, 1700, may also include an orientation device (not shown) capable of determining an orientation of the computer system in two or more dimensions. Orientation determining devices and related circuitries are well known to those of ordinary skill.

Some of the details, concepts, aspects, features, characteristics, examples, and/or alternatives of a component/element discussed above with respect to one implementation, embodiment, and/or methodology may be applicable to a like component in another implementation, embodiment, and/or methodology, even though for the sake of brevity it may not have been repeated above. It is noted that any suitable combinations of components and elements of different implementations, embodiments, and/or methodologies (as well as other variations and modifications) are possible in light of the teachings herein, will be apparent to those of ordinary skill, and should be considered as part of the spirit and scope of the present disclosure. Additionally, functionality described with respect to a single component/element is contemplated to be performed by a plurality of like components/elements (e.g., in a more dispersed fashion locally and/or remotely). Functionality described with respect to multiple components/elements may be performed by fewer like or different components/elements (e.g., in a more integrated fashion).

For example, for the sake of brevity, some of the details, concepts, aspects, features, characteristics, examples, and/or alternatives discussed with respect to one implementation and/or embodiment of the current disclosure may not be repeated in a discussion of another implementation and/or embodiment where such details, concepts, aspects, features, characteristics, examples, and/or alternatives may be applicable for like items or in combination with other items discussed with respect to the subsequent figure and, as applicable, may be included in (or otherwise apply similarly with) the implementation of that additional discussion, except where noted or inapplicable/incompatible.

While details, concepts, aspects, features, characteristics, examples, and/or alternatives of various implementations and embodiments herein are described in the context of one or more embodiments of an ARSM platform, it is contemplated that any such details, concepts, aspects, features, characteristics, examples, and/or alternatives and corresponding implementations and embodiments may also be utilized with a different embodiment of a ARSM platform or other type of online platform, system, or environment as applicable.

If present in a claim or a description herein, the use of ordinal terms (e.g., "first," "second," "third," etc.) to modify another term or phrase, such use is solely as labels to distinguish one item from another item of the same name and should not itself be construed to impart any order, precedence, or priority of one item over another. If any method is presented herein through the use of a flowchart or other flow diagram with a sequential nature, it is noted that it may be possible for one or more of the steps depicted to be performed in a parallel fashion to each other. Additionally, methods presented in a particular order of steps may have their steps performed in a different order than presented as applicable as well as having fewer steps or additional steps involved in the method. As used herein, a "set" of items may include one or more of such items.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The invention claimed is:

1. A method for managing an augmented reality social media platform, the method comprising:
   providing an augmented reality social media platform application to a plurality of devices, the augmented reality social media application for providing one or more augmented reality user interfaces of the augmented reality social media platform;
   receiving from an optical capture element of a first device belonging to a first user, a still and/or moving image of a first real-world proximity surrounding the first device, the first real-world proximity being a part of a real-world defined area that is controlled by a first real-world organization, the augmented reality social media platform including a virtual mapping corresponding to the real-world defined area, the virtual mapping including a plurality of leasable virtual subdivisions, each of the leasable virtual subdivisions corresponding to a real-world subdivision of the real-world defined area;
   receiving from a second user of the augmented reality social media platform a request to lease a first virtual subdivision of the plurality of leasable virtual subdivisions;
   receiving a first identifier of the real-world identity of the second user;
   correlating the first identifier with a current database of people currently affiliated with the first real-world organization;
   if the first identifier positively correlates with a person in the current database:
      assigning within the augmented reality social media platform a first virtual leasehold corresponding to the first virtual subdivision to the second user, the first virtual leasehold including a time limitation corresponding to the second user's affiliation with the first real-world organization;
      displaying via a first display of the one or more augmented reality user interfaces an augmented display of the first real-world proximity; and
      when the first real-world proximity corresponds to the first real-world subdivision, displaying via the first display one or more virtual indicators associated with the first virtual leasehold; and
   if the first identifier does not correlate with a person in the current database:
      providing a second display of the one or more augmented reality user interfaces to the second user with a denial of the first virtual leasehold.

2. A method according to claim 1, wherein the first real-world organization includes an organization selected from the group consisting of an educational institution, a sporting organization, a retail organization, a real estate development organization, a shopping mall, and any combinations thereof.

3. A method according to claim 2, wherein the educational institution includes an educational entity selected from the group consisting of a university, a college, an academy, a public school, a private school, an elementary school, a secondary school, a vocational school, and any combinations thereof.

4. A method according to claim 2, wherein the sporting organization includes a sporting entity selected from the group consisting of a sports franchise, an amateur sporting entity, a professional sporting entity, a club sporting entity, a sports facility entity, a sporting fan group, and any combination thereof.

5. A method according to claim 1, wherein the first real-world organization is an educational institution and the real-world defined area includes a campus of the educational institution.

6. A method according to claim 5, wherein the time limitation is bounded by the enrollment status of the second user in the educational institution.

7. A method according to claim 1, wherein being controlled by a first real-world organization includes a controlling factor selected from the group consisting of owning an interest in the real-world defined area, leasing an interest in the real-world defined area, having license to the real-world defined area, having an ability to physically limit access to people to the real-world defined area, having an ability to legally limit access to people to the real-world defined area, and any combinations thereof.

8. A method according to claim 1, further comprising:
   temporarily reassigning within the augmented reality social media platform the first leasehold to a second virtual subdivision of the plurality of leasable virtual subdivisions; and
   providing a second augmented reality user interface of the augmented reality social media platform to a third user of the augmented reality social media platform, the second augmented reality user interface including:
      a display of a second proximity of the third user, the second proximity including a second real-world subdivision corresponding to the second virtual subdivision, and
      a display of a second virtual indicator associated with a real-world offering of the first leasehold.

9. A method according to claim 8, wherein the temporarily reassigning is based on a reassignment criteria that includes a criteria selected from the group consisting of a setting in the augmented reality social media platform by one or more additional users of the augmented reality social media platform, a setting in the augmented reality social media platform by the first user, a setting in the augmented reality social media platform by the second user, a setting in the augmented reality social media platform by the third user, a recipient setting, a leasehold setting of the first leasehold, an input by the first user, an input by the third user, an offering marketing criteria input to and/or determined by the augmented reality social media platform, a random reassignment schedule, a predetermined reassignment schedule, a current weather condition for the first real-world subdivision, a predicted weather condition for the first real-world subdivision, a current weather condition for the second real-world subdivision, a predicted weather condition for the second real-world subdivision, a time period in a calendar year, a calendar season, and any combinations thereof.

10. A method according to claim 9, wherein an offering marketing criteria includes a criteria selected from the group consisting of a demographic characteristic of one or more people that move across or near the second real-world subdivision, a demographic characteristic of one or more people that move across or near the first real-world subdivision, a demographic characteristic of one or more people predicted to move across or near the second real-world subdivision, a demographic characteristic of one or more people predicted to move across or near the first real-world subdivision, a demographic characteristic of one or more people scheduled to move across or near the second real-world subdivision, a demographic characteristic of one or more people scheduled to move across or near the first real-world subdivision, and any combinations thereof.

11. A method according to claim 10, wherein a demographic characteristic includes a characteristic selected from the group consisting of a race of an individual, a gender of an individual, a sex of an individual, a sexual orientation of an individual, a course of study of an individual, an enrollment status of an individual in a particular course, an enrollment status of an individual in a real-world organization, a density of people traversing a particular area of a real-world defined area, a density of people traversing a real-world subdivision, and any combinations thereof.

12. A method according to claim 9, wherein the real-world social media platform includes a categorization setting for the first real-world offering and, optionally, one or more additional real-world offerings, the categorization setting including an association of one or more of the criteria of the reassignment criteria with each of the first real-world offering and, optionally, one or more additional real-world offerings.

13. A method according to claim 8, wherein the temporarily reassigning includes:
temporarily unassigning the first virtual leasehold from the first virtual subdivision.

14. A method according to claim 8, wherein the temporarily reassigning includes:
continuing to have the first virtual leasehold assigned to the first virtual subdivision in addition to the second virtual subdivision.

15. A method according to claim 8, further comprising associating a first real-world offering with the first virtual leasehold and/or the first virtual subdivision.

16. A method according to claim 1, further comprising:
monitoring a real-world traffic indicator, wherein the real-world traffic indicator corresponds to an actual and/or predicted characteristic of people traversing the real-world defined area; and
reassigning the first virtual leasehold, based on the real-world traffic indicator, from the first virtual subdivision to a second virtual subdivision of the plurality of leasable virtual subdivisions.

17. A method according claim 16, wherein the people include only people who are members of the same group and the same group is a group of users of the augmented reality social media platform, a group of non-users of the augmented reality social media platform, a group of people who are affiliated with an organization that controls the real-world defined area, or a group of people who are not unaffiliated with an organization that controls the real-world defined area.

18. A method according to claim 16, wherein the actual and/or predicted characteristic of people traversing the real-world defined area is based on people including at least one person selected from the group consisting of a user of the augmented reality social media platform, a non-user of the augmented reality social media platform, a person who is affiliated with an organization that controls the real-world defined area, a person who is unaffiliated with an organization that controls the real-world defined area, and any combinations thereof.

19. A method according to claim 8, further comprising monitoring a real-world traffic indicator, wherein the real-world traffic indicator corresponds to an actual and/or predicted characteristic of people traversing the real-world defined area, wherein the temporary reassigning of the first virtual leasehold to the second virtual subdivision is based on the real-world traffic indicator.

20. A method according to claim 1, further comprising associating a first real-world offering with the first virtual leasehold and/or the first virtual subdivision, wherein the first real-world offering includes an offering selected from the group consisting of a product for sale, a service for sale, a product offering, a service offering, a promotional item, a recruiting item, an event item, and any combinations thereof.

21. A method according to claim 1, further comprising associating a first real-world offering with the first virtual leasehold and/or the first virtual subdivision, wherein the first real-world offering is in a first offering set of a plurality of real-world offerings.

22. A method according to claim 1, further comprising associating a first real-world offering with the first virtual leasehold and/or the first virtual subdivision, wherein each of the plurality of real-world offerings includes an offering of a first virtual store of the first virtual leasehold.

23. A method according to claim 1, further comprising associating a first real-world offering with the first virtual leasehold and/or the first virtual subdivision, wherein the first real-world offering is represented by a first virtual indicator of the one or more virtual indicators in the first display.

24. A method according to claim 1, further comprising associating a first real-world offering with the first virtual leasehold and/or the first virtual subdivision, wherein the augmented reality social media platform includes a first inventory listing for the first virtual store, the first inventory listing including the first real-world offering and, optionally, one or more additional real-world offerings.

25. A method according to claim 24, further comprising:
receiving from a third user of the augmented reality social media platform a request to lease a third virtual subdivision of the plurality of leasable virtual subdivisions;
assigning within the augmented reality social media platform a second virtual leasehold corresponding to the third virtual subdivision to the third user;
temporarily allocating one or more shared offerings from the first inventory listing to the second virtual leasehold; and
providing a third augmented reality user interface of the augmented reality social media platform to a fourth user of the augmented reality social media platform, the third augmented reality user interface including:
a display of a third proximity of the fourth user, the third proximity including a second real-world subdivision corresponding to the third virtual subdivision, and
a display of a third virtual indicator associated with a first one of the one or more shared offerings.

26. A method according to claim 25, wherein the temporarily allocating is based on a first criteria that includes a criteria selected from the group consisting of a setting in the augmented reality social media platform by one or more additional users of the augmented reality social media platform, a setting in the augmented reality social media platform by the first user, a setting in the augmented reality social media platform by the second user, a setting in the augmented reality social media platform by the third user, a setting in the augmented reality social media platform by the fourth user, a recipient setting, a leasehold setting of the first leasehold, a leasehold setting of the second leasehold, an input by the first user, an input by the third user, an offering marketing criteria input to and/or determined by the augmented reality social media platform, a random reassignment schedule, a predetermined reassignment schedule, a current weather condition for the first real-world subdivision, a predicted weather condition for the first real-world subdivision, a current weather condition for the second real-world subdivision, a predicted weather condition for the second real-world subdivision, a time period in a calendar year, a calendar season, and any combinations thereof.

27. A method according to claim 26, wherein an offering marketing criteria includes a criteria selected from the group consisting of a demographic characteristic of one or more people that move across or near the second real-world subdivision, a demographic characteristic of one or more people that move across or near the first real-world subdivision, a demographic characteristic of one or more people predicted to move across or near the second real-world subdivision, a demographic characteristic of one or more people predicted to move across or near the first real-world subdivision, a demographic characteristic of one or more people scheduled to move across or near the second real-world subdivision, a demographic characteristic of one or more people scheduled to move across or near the first real-world subdivision, and any combinations thereof.

28. A method according to claim 27, wherein a demographic characteristic includes a characteristic selected from the group consisting of a race of an individual, a gender of an individual, a sex of an individual, a sexual orientation of an individual, a course of study of an individual, an enrollment status of an individual in a particular course, an enrollment status of an individual in a real-world organization, a density of people traversing a particular area of a real-world defined area, a density of people traversing a real-world subdivision, and any combinations thereof.

29. A method according to claim 1, further comprising:
temporarily allocating one or more shared real-world offerings from a first inventory listing of the first virtual leasehold to a second virtual leasehold corresponding to a second virtual subdivision of the plurality of leasable virtual subdivisions; and
providing a second augmented reality user interface of the augmented reality social media platform to a fourth user of the augmented reality social media platform, the second augmented reality user interface including:
a display of a second proximity of the fourth user, the second proximity including a second real-world subdivision corresponding to the second virtual subdivision, and
a display of a second virtual indicator associated with a first one of the one or more shared offerings.

30. A method according to claim 29, wherein the temporarily allocating is based on a first criteria that includes a criteria selected from the group consisting of a setting in the augmented reality social media platform by one or more additional users of the augmented reality social media platform, a setting in the augmented reality social media platform by the first user, a setting in the augmented reality social media platform by the second user, a setting in the augmented reality social media platform by the third user, a setting in the augmented reality social media platform by the fourth user, a recipient setting, a leasehold setting of the first leasehold, a leasehold setting of the second leasehold, an input by the first user, an input by the third user, an offering marketing criteria input to and/or determined by the augmented reality social media platform, a random reassignment schedule, a predetermined reassignment schedule, a current weather condition for the first real-world subdivision, a predicted weather condition for the first real-world subdivision, a current weather condition for the second real-world subdivision, a predicted weather condition for the second real-world subdivision, a time period in a calendar year, a calendar season, and any combinations thereof.

31. A method according to claim 1, wherein the one or more virtual indicators includes an indicator selected from the group consisting of an indicator of a virtual e-commerce store, a sign, an image, a border, a product for sale, a visual indicator of a product for sale, a visual indicator associated with a pop-up graphic, and any combinations thereof.

32. A method according to claim 1, further comprising limiting the viewability of a first one of the one or more virtual indicators in the first display by a setting selected from the group consisting of a recipient setting selected by the second user in the augmented reality social media platform, a leasehold setting selected by a user authorized by the first leasehold in the augmented reality social media platform, and any combinations thereof.

33. A method according to claim 32, wherein the recipient setting and/or leasehold setting each includes a setting selected from the group consisting of a minimum distance from a recipient user to a virtual subdivision, a maximum distance from the recipient user to a virtual subdivision, a demographic characteristic of a virtual leasehold or its assignee, a demographic characteristic of the recipient user, a sales volume of a real-world offering, an availability of a real-world offering, a popularity of a real-world offering, a sales volume of a virtual store of a virtual leasehold, an availability of a product of a virtual store of a virtual leasehold, a popularity of a product of a virtual store of a virtual leasehold, a popularity of a virtual store of a virtual leasehold, a popularity of a virtual leasehold, a popularity of a virtual subdivision, a promotional status of a virtual store of a virtual leasehold, an input of a specific desired product, an input of a favorited product, an input of a favorited virtual store of a virtual leasehold, an input of a favorited virtual leasehold, an input of a favorited virtual subdivision, a time period of existence of a virtual leasehold, a time period of existence of a virtual store of a virtual leasehold, a list of designated customers, and any combinations thereof.

34. A method according to claim 33, wherein the availability of a product and/or real-world product includes an availability selected from the group consisting of an availability within a set period of time, a current availability, a scheduled availability, and any combinations thereof.

35. A method according to one of claim 1, further comprising limiting the viewability of a first one of the one or more virtual indicators based on the location of the second user in the real-world defined area.

36. A method according to claim 35, wherein the second user must be located within a real-world subdivision corresponding to a virtual subdivision to which the first virtual leasehold is assigned for the first one of the one or more virtual indicators to be viewable to the second user.

37. A method according to claim 35, wherein the second user must be located within a predetermined distance to a real-world subdivision corresponding to a virtual subdivision to which the first virtual leasehold is assigned for the first one of the one or more virtual indicators to be viewable to the second user.

38. A method according to claim 35, wherein the limiting the viewability is defined in the augmented reality social media platform by a recipient setting, a leasehold setting, and any combinations thereof.

39. A method according to claim 1, wherein the first virtual leasehold includes a right for the second user to establish a virtual store in the first virtual subdivision or any other virtual subdivision to which the first virtual leasehold is associated.

40. A method according to claim 39, wherein the one or more virtual indicators includes a first visual indicator of a first product for sale.

41. A method according to claim 40, wherein the first product for sale is included in a merchandise listing of the virtual store, the augmented reality social media platform having access to the merchandise listing, the merchandise listing including a plurality of products for sale.

42. A method according to claim 41, wherein the first visual indicator is part of a set of visual indicators, each of the visual indicators representing one or more select products from the merchandise listing, the one or more virtual indicators including the set of visual indicators.

43. A method according to claim 39, wherein the one or more virtual indicators includes a first visual indicator associated with a pop up graphic.

44. A method according to claim 43, further comprising:
receiving a selection of the first visual indicator by the first user via a user interface of the augmented reality social media platform; and
providing a display of a pop up graphic.

45. A method according to claim 44, wherein the pop up graphic includes a listing of one or more products for sale by a first virtual store of the first virtual leasehold.

46. A method according to claim 44, wherein the pop up graphic includes an element selected from the group consisting of a listing of one or more products for sale, a description of a product for sale, an image of a product for sale, a graphical display for purchasing a product or service for sale, a link to a graphical display for purchasing a product for sale, an user interface for providing comment, a logo of a virtual store of a virtual leasehold, and any combinations thereof.

47. A method according to claim 44, wherein the first visual indicator includes a graphical element selected from the group consisting of a logo of a virtual store of a virtual leasehold, an image of a product for sale, an advertisement, and any combinations thereof.

48. A method according to claim 44, wherein availability of the pop up graphic is based on the second user being located within the real-world subdivision associated with the virtual subdivision to which the first virtual leasehold is assigned.

49. A method according to claim 44, wherein availability of the pop up graphic is based on the second user being located within a predetermined distance to the real-world subdivision associated with the virtual subdivision to which the first virtual leasehold is assigned.

50. A method according to claim 1, wherein a first virtual indicator of the one or more virtual indicators is associated with a pop up graphic.

51. A method according to claim 50, wherein the pop up graphic includes an element selected from the group consisting of a listing of one or more available real-world offerings, a description of one or more real-world offerings, an image of one or more real-world offerings, a graphical display for purchasing a real-world offering, a link to a graphical display for purchasing a real-world offering, a listing of one or more products for sale, a description of a product for sale, an image of a product for sale, a graphical display for purchasing a product and/or service for sale, a link to a graphical display for purchasing a product and/or service for sale, a user interface for providing comment, a logo of a virtual store of a virtual leasehold, a logo of a virtual leasehold, a logo associated with the first user or another user affiliated with the first virtual leasehold, and any combinations thereof.

52. A method according to claim 50, wherein availability of the pop up graphic is based on the second user being located within the real-world subdivision associated with the virtual subdivision to which the first virtual leasehold is assigned.

53. A method according to claim 50, wherein availability of the pop up graphic is based on the second user being located within a predetermined distance to the real-world subdivision associated with the virtual subdivision to which the first virtual leasehold is assigned.

54. A method according to claim 50, wherein the first visual indicator includes a graphical element selected from the group consisting of a logo of a virtual store of a virtual leasehold, a logo of a virtual leasehold, a logo associated with the first user or another user affiliated with the first virtual leasehold, an image of a real-world offering, an image of a product for sale, an advertisement, and any combinations thereof.

55. A method according to claim 1, further comprising:
receiving from a fourth user of the augmented reality social media platform a request to lease a fourth virtual subdivision of the plurality of leasable virtual subdivisions;
assigning within the augmented reality social media platform a fourth virtual leasehold corresponding to the fourth virtual subdivision to the fourth user;
temporarily reassigning within the augmented reality social media platform the fourth leasehold to the first virtual subdivision of the plurality of leasable virtual subdivisions; and
providing a fourth augmented reality user interface of the augmented reality social media platform to a fifth user of the augmented reality social media platform, the third augmented reality user interface including:
a display of the first proximity, and
a display of a fourth virtual indicator associated with a real-world offering of the fourth leasehold.

56. A method according to claim 1, further comprising associating a first real-world offering with the first virtual leasehold and/or the first virtual subdivision.

57. A method according to claim 1, further comprising limiting the viewability of a first one of the one or more virtual indicators based on the location of the second user in the real-world defined area.

58. A method according to claim 57, wherein the second user must be located within a real-world subdivision corresponding to a virtual subdivision to which the first virtual leasehold is assigned for the first one of the one or more virtual indicators to be viewable to the second user.

59. A method according to claim 57, wherein the second user must be located within a predetermined distance to a real-world subdivision corresponding to a virtual subdivision to which the first virtual leasehold is assigned for the first one of the one or more virtual indicators to be viewable to the second user.

60. A method according to claim 57, wherein the limiting the viewability is defined in the augmented reality social media platform by a recipient setting, a leasehold setting, and any combinations thereof.

61. A method for managing an augmented reality social media platform, the method comprising:
    providing an augmented reality social media platform application to a plurality of devices, the augmented reality social media application for providing one or more augmented reality user interfaces of the augmented reality social media platform;
    receiving from an optical capture element of a first device belonging to a first user, a still and/or moving image of a first real-world proximity surrounding the first device, the first real-world proximity being a part of a real-world defined area that is controlled by a first real-world organization, the augmented reality social media platform including a virtual mapping corresponding to the real-world defined area, the virtual mapping including a plurality of leasable virtual subdivisions, each of the leasable virtual subdivisions corresponding to a real-world subdivision of the real-world defined area;
    receiving from a second user of the augmented reality social media platform a request to lease a first virtual subdivision of the plurality of leasable virtual subdivisions;
    receiving a first identifier of the real-world identity of the second user;
    correlating the first identifier with a current database of people currently affiliated with the first real-world organization;
    if the first identifier positively correlates with a person in the current database:
        assigning within the augmented reality social media platform a first virtual leasehold corresponding to the first virtual subdivision to the second user, the first virtual leasehold including a time limitation corresponding to the second user's affiliation with the first real-world organization;
        displaying via a first display of the one or more augmented reality user interfaces an augmented display of the first real-world proximity; and
        when the first real-world proximity corresponds to the first real-world subdivision, displaying via the first display one or more virtual indicators associated with the first virtual leasehold;
    if the first identifier does not correlate with a person in the current database:
        providing a second display of the one or more augmented reality user interfaces to the second user with a denial of the first virtual leasehold;
    temporarily reassigning within the augmented reality social media platform the first leasehold to a second virtual subdivision of the plurality of leasable virtual subdivisions;
    providing a second augmented reality user interface of the augmented reality social media platform to a third user of the augmented reality social media platform, the second augmented reality user interface including:
        a display of a second proximity of the third user, the second proximity including a second real-world subdivision corresponding to the second virtual subdivision, and
        a display of a second virtual indicator associated with a real-world offering of the first leasehold;
    temporarily allocating one or more shared real-world offerings from a first inventory listing of the first virtual leasehold to a second virtual leasehold corresponding to a third virtual subdivision of the plurality of leasable virtual subdivisions; and
    providing a third augmented reality user interface of the augmented reality social media platform to a fourth user of the augmented reality social media platform, the third augmented reality user interface including:
        a display of a second proximity of the fourth user, the second proximity including a second real-world subdivision corresponding to the third virtual subdivision, and
        a display of a third virtual indicator associated with a first one of the one or more shared real-world offerings.

62. A method according to claim 61, wherein the temporarily allocating is based on a first criteria that includes a criteria selected from the group consisting of a setting in the augmented reality social media platform by one or more additional users of the augmented reality social media platform, a setting in the augmented reality social media platform by the first user, a setting in the augmented reality social media platform by the second user, a setting in the augmented reality social media platform by the third user, a setting in the augmented reality social media platform by the fourth user, a recipient setting, a leasehold setting of the first leasehold, a leasehold setting of the second leasehold, an input by the first user, an input by the third user, an offering marketing criteria input to and/or determined by the augmented reality social media platform, a random reassignment schedule, a predetermined reassignment schedule, a current weather condition for the first real-world subdivision, a predicted weather condition for the first real-world subdivision, a current weather condition for the second real-world subdivision, a predicted weather condition for the second real-world subdivision, a time period in a calendar year, a calendar season, and any combinations thereof.

* * * * *